US012610384B2

(12) United States Patent
Wu et al.

(10) Patent No.: US 12,610,384 B2
(45) Date of Patent: *Apr. 21, 2026

(54) METHOD AND DEVICE IN NODES USED FOR WIRELESS COMMUNICATION

(71) Applicant: Apogee Networks, LLC, Dallas, TX (US)

(72) Inventors: Keying Wu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,112

(22) Filed: Jul. 5, 2023

(65) Prior Publication Data

US 2023/0354393 A1    Nov. 2, 2023

Related U.S. Application Data

(63) Continuation of application No. 17/098,329, filed on Nov. 14, 2020, now Pat. No. 11,743,927, which is a
(Continued)

(30) Foreign Application Priority Data

Apr. 2, 2019    (CN) .......................... 201910261793.5

(51) Int. Cl.
*H04W 72/53*        (2023.01)
*H04L 5/00*        (2006.01)
(Continued)

(52) U.S. Cl.
CPC ........... *H04W 72/53* (2023.01); *H04L 5/0051* (2013.01); *H04W 72/046* (2013.01); *H04W 72/21* (2023.01)

(58) Field of Classification Search
None
See application file for complete search history.

(56) References Cited

U.S. PATENT DOCUMENTS

| 11,564,218 | B2 | 1/2023 | Zhang et al. |
| 2017/0288743 | A1 | 10/2017 | Nam et al. |
| (Continued) | | | |

FOREIGN PATENT DOCUMENTS

| CN | 107888238 A | 4/2018 |
| CN | 108111274 A | 6/2018 |
| (Continued) | | |

OTHER PUBLICATIONS

ISR in application PCT/CN2020/080858 dated May 22, 2020.
(Continued)

*Primary Examiner* — Luna Weissberger
(74) *Attorney, Agent, or Firm* — Volpe Koenig

(57) ABSTRACT

The present disclosure provides a method and device in nodes for wireless communication. A first node receives first information; and receives a first signaling. The first information is used for determining K resource blocks; the K resource blocks respectively correspond to K reference-signal resource groups; any reference-signal resource in the K reference-signal resource groups corresponds to one of M first-type indexes; the first signaling is used for activating a first index in the M first-type indexes; a first resource block is any of the K resource blocks, a first reference-signal resource is used for determining a spatial relation of the first resource block, and the first reference-signal resource is one reference-signal resource corresponding to the first index in a reference-signal resource group corresponding to the first resource block. The above method employs information selected by TRP/panel, thus reducing a signaling overhead and delay of beam management.

16 Claims, 17 Drawing Sheets

Related U.S. Application Data continuation of application No. PCT/CN2020/080858, filed on Mar. 24, 2020.

(51) Int. Cl.
| | | |
|---|---|---|
| *H04W 72/044* | (2023.01) | |
| *H04W 72/21* | (2023.01) | |

(56) References Cited

U.S. PATENT DOCUMENTS

| | | | | |
|---|---|---|---|---|
| 2018/0219606 | A1* | 8/2018 | Ng ........................ | H04L 5/0053 |
| 2019/0058517 | A1 | 2/2019 | Kang et al. | |
| 2019/0069285 | A1 | 2/2019 | Chandrasekhar et al. | |
| 2019/0141693 | A1* | 5/2019 | Guo ....................... | H04L 5/0053 |
| 2019/0149365 | A1 | 5/2019 | Chatterjee et al. | |
| 2019/0174466 | A1* | 6/2019 | Zhang ................... | H04L 5/0057 |
| 2019/0215870 | A1* | 7/2019 | Babaei .................. | H04W 24/10 |
| 2020/0314860 | A1* | 10/2020 | Zhou ..................... | H04W 72/23 |
| 2021/0084623 | A1* | 3/2021 | Zhang ................... | H04L 5/0053 |
| 2021/0243763 | A1 | 8/2021 | Zhou et al. | |
| 2022/0116183 | A1* | 4/2022 | Gao ...................... | H04L 1/1812 |

FOREIGN PATENT DOCUMENTS

| | | |
|---|---|---|
| CN | 108401283 A | 8/2018 |
| CN | 108631984 A | 10/2018 |
| CN | 108736944 A | 11/2018 |
| CN | 109155659 A | 1/2019 |
| CN | 109391962 A | 2/2019 |

OTHER PUBLICATIONS

AT&T. "On the details of multi-TRP and muli-panel transmission" 3GPPTSG RANwGINRAd-Hvc#2 R1-1710428,Jun. 30, 2017(Jun. 30, 2017).

Second Office Action received in application No. CN201910261793.5 dated Aug. 2, 2021.

"ZTE Enhancements on multi-beam operation" 3GPP TSG RAN WG1 Meeting #96bis R1-1904014 Mar. 30, 2019.

"ZTE Remaining issues on beam management" 3GPP TSG RAN WG1 Meeting #93 R1-1805828 May 11, 2018.

CN201910261793.5 1st Office Action dated Mar. 2, 2021.

CN201910261793.5 First Search Report dated Feb. 24, 2021.

Notification to Grant Patent Right for Invention of Chinses patent application No. CN201910261793.5 dated Oct. 22, 2021.

Third Generation Partnership Project, "Technical Specification Group Radio Access Network; NR; Physical channels and modulation (Release 15)," 3GPP TS 38.211 V15.5.0 (Mar. 2019).

Third Generation Partnership Project, "Technical Specification Group Radio Access Network; NR; Physical layer procedures for control (Release 15)," 3GPP TS 38.213 V15.5.0 (Mar. 2019).

Third Generation Partnership Project, "Technical Specification Group Radio Access Network; NR; Physical layer procedures for data (Release 15)," 3GPP TS 38.214 V15.5.0 (Mar. 2019).

Third Generation Partnership Project, "Technical Specification Group Radio Access Network; NR; Medium Access Control (MAC) protocol specification (Release 15)," 3GPP TS 38.321 V15.4.0 (Dec. 2018).

Third Generation Partnership Project, "Technical Specification Group Radio Access Network NR Radio Resource Control (RRC) protocol specification (Release 15)," 3GPP TS 38.331 V15.4.0 (Dec. 2018).

* cited by examiner

First node receiving third radio signal

First node transmitting second radio signal

FIG. 9

| Reference signal resource#0 |
| :---: |

$\vdots$

| First reference signal resource |
| :---: |

$\vdots$

| Reference signal resource#S-1 |
| :---: |

FIG.12

Second signaling    activating  ⟶  First reference signal resource

FIG.13

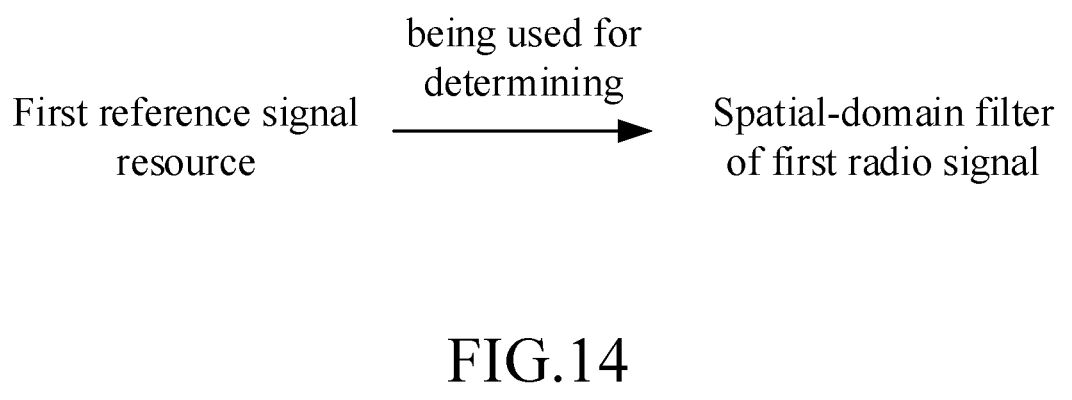

First reference signal resource $\xrightarrow{\text{being used for determining}}$ Spatial-domain filter of first radio signal

FIG.14

Second information $\xrightarrow{\text{indicating}}$ M

FIG.15

METHOD AND DEVICE IN NODES USED FOR WIRELESS COMMUNICATION

CROSS REFERENCE TO RELATED APPLICATIONS

This application is a continuation of the U.S. patent application Ser. No. 17/098,329, filed on Nov. 14, 2020, which is a continuation of International Application No. PCT/CN2020/080858, filed Mar. 24, 2020, claims the priority benefit of Chinese Patent Application No. 201910261793.5, filed on Apr. 2, 2019, the full disclosure of which is incorporated herein by reference.

BACKGROUND

Technical Field

The present disclosure relates to transmission methods and devices in wireless communication systems, and in particular to a transmission method and device of radio signals in a wireless communication system supporting cellular network.

Related Art

Multi-antenna technology is a key technology in $3^{rd}$ Generation Partner Project (3GPP) Long-term Evolution (LTE) system and New Radio (NR) system. By configuring Multiple antennas at a communication node, such as at base station or User Equipment (UE), extra spatial freedom degrees are acquired. Multiple antennas based on beamforming to form a relatively narrow beam which points to a particular direction to improve the quality of communication. When multiple antennas belong to multiple Transmitter Receiver Points (TRP)/panels, extra diversity gains can be acquired by employing spatial differences between different TRPs/panels.

SUMMARY

The inventors have found through researches that in multi-TRP/panel transmission, TRP/panel selection is the simplest and most effective implementation method. So how to employ TRP/panel selection to simplify beam management is a problem to be solved.

In view of the above problem, the present disclosure provides a solution. It should be noted that the embodiments of a first node in the present disclosure and the characteristics of the embodiments may be applied to a second node if no conflict is incurred, and vice versa. The embodiments of the present disclosure and the characteristics of the embodiments may be mutually combined if no conflict is incurred.

The present disclosure provides a method in a first node for wireless communications, comprising:

receiving first information; and
receiving a first signaling;
herein, the first information is used for determining K resource blocks, K being a positive integer greater than 1; the K resource blocks respectively correspond to K reference-signal resource groups, and any of the K reference-signal resource groups comprises a positive integer number of reference-signal resource(s); any reference-signal resource in the K reference-signal resource groups corresponds to one of M first-type indexes, M being a positive integer greater than 1; the first signaling is used for activating a first index in the M first-type indexes; a first resource block is any of the K resource blocks, a first reference-signal resource is used for determining a spatial relation of the first resource block, and the first reference-signal resource is one reference-signal resource corresponding to the first index in a first reference-signal resource group; the first reference-signal resource group is one of the K reference-signal resource groups corresponding to the first resource block.

In one embodiment, a problem needed to be solved in the present disclosure is: how to use information selected by TRP/panel to simplify beam management. The above method activates a spatial relation that each of the K resource blocks corresponds to the first index by activating the first index, thus solving the above problem.

In one embodiment, the above method is essential in that the M first-type indexes are indexes of M TRPs/panels; reference-signal resources in the K reference-signal resource groups respectively correspond to alternative spatial relations or alternative Transmission Configuration Indication (TCI) states of the K resource blocks, and each reference-signal resource also corresponds to one of the M first-type indexes simultaneously. By activating the first index in the M first-type indexes, one alternative spatial relation or an alternative TCI state corresponding to the first index of each of the K resource blocks is activated. The above method greatly reduces a signaling overhead and delay of beam management.

According to one aspect of the present disclosure, comprising:

transmitting a second radio signal;
herein, the second radio signal indicates that a third radio signal is correctly received, and the third radio signal carries the first signaling.

According to one embodiment of the present disclosure, wherein from a first time, the first reference-signal resource is used for determining the spatial relation of the first resource block; the first time is later than a time unit where the second radio signal is located, and a time interval between the first time and the time unit where the second radio signal is located is a first time interval.

According to one embodiment of the present disclosure, wherein each of S reference-signal resources in the first reference-signal resource group corresponds to the first index, S being a positive integer greater than 1; and a position of the first reference-signal resource in the S reference-signal resources is default.

According to one aspect of the present disclosure, comprising:

receiving a second signaling;
herein, each of S reference-signal resources in the first reference-signal resource group corresponds to the first index, S being a positive integer greater than 1; and the second signaling is used for activating the first reference-signal resource out of the S reference-signal resources.

According to one aspect of the present disclosure, comprising:

operating a first radio signal in the first resource block;
herein, the first reference-signal resource is used for determining a spatial-domain filter of the first radio signal; the operating action is transmitting, or the operating action is receiving.

According to one aspect of the present disclosure, comprising:

transmitting a first radio signal in the first resource block;

herein, the first reference-signal resource is used for determining a spatial-domain filter of the first radio signal.

According to one aspect of the present disclosure, comprising:

receiving a first radio signal in the first resource block;

herein, the first reference-signal resource is used for determining a spatial-domain filter of the first radio signal.

According to one aspect of the present disclosure, comprising:

transmitting second information;

herein, the second information indicates the M.

According to one aspect of the present disclosure, wherein the first node is a UE.

According to one aspect of the present disclosure, wherein the first node is a relay node.

The present disclosure provides a method in a second node for wireless communications, comprising:

transmitting first information; and transmitting a first signaling;

herein, the first information is used for determining K resource blocks, K being a positive integer greater than 1; the K resource blocks respectively correspond to K reference-signal resource groups, and any of the K reference-signal resource groups comprises a positive integer number of reference-signal resource(s); any reference-signal resource in the K reference-signal resource groups corresponds to one of M first-type indexes, M being a positive integer greater than 1; the first signaling is used for activating a first index in the M first-type indexes; a first resource block is any of the K resource blocks, a first reference-signal resource is used for determining a spatial relation of the first resource block, and the first reference-signal resource is one reference-signal resource corresponding to the first index in a first reference-signal resource group; the first reference-signal resource group is one of the K reference-signal resource groups corresponding to the first resource block.

According to one aspect of the present disclosure, comprising:

receiving a second radio signal;

herein, the second radio signal indicates that a third radio signal is correctly received, and the third radio signal carries the first signaling.

According to one embodiment of the present disclosure, wherein from a first time, the first reference-signal resource is used for determining the spatial relation of the first resource block; the first time is later than a time unit where the second radio signal is located, and a time interval between the first time and the time unit where the second radio signal is located is a first time interval.

According to one embodiment of the present disclosure, wherein each of S reference-signal resources in the first reference-signal resource group corresponds to the first index, S being a positive integer greater than 1; and a position of the first reference-signal resource in the S reference-signal resources is default.

According to one aspect of the present disclosure, comprising:

transmitting a second signaling;

herein, each of S reference-signal resources in the first reference-signal resource group corresponds to the first index, S being a positive integer greater than 1;

and the second signaling is used for activating the first reference-signal resource out of the S reference-signal resources.

According to one aspect of the present disclosure, comprising:

performing a first radio signal in the first resource block;

herein, the first reference-signal resource is used for determining a spatial-domain filter of the first radio signal; the performing action is receiving, or, the performing action is transmitting.

According to one aspect of the present disclosure, comprising:

receiving a first radio signal in the first resource block;

herein, the first reference-signal resource is used for determining a spatial-domain filter of the first radio signal.

According to one aspect of the present disclosure, comprising:

transmitting a first radio signal in the first resource block;

herein, the first reference-signal resource is used for determining a spatial-domain filter of the first radio signal.

According to one aspect of the present disclosure, comprising:

receiving second information;

herein, the second information indicates the M.

According to one aspect of the present disclosure, wherein the second node is a base station.

According to one aspect of the present disclosure, wherein the second node is a relay node.

The present disclosure provides a first node for wireless communication, comprising:

a first processor, receiving first information and a first signaling;

herein, the first information is used for determining K resource blocks, K being a positive integer greater than 1; the K resource blocks respectively correspond to K reference-signal resource groups, and any of the K reference-signal resource groups comprises a positive integer number of reference-signal resource(s); any reference-signal resource in the K reference-signal resource groups corresponds to one of M first-type indexes, M being a positive integer greater than 1; the first signaling is used for activating a first index in the M first-type indexes; a first resource block is any of the K resource blocks, a first reference-signal resource is used for determining a spatial relation of the first resource block, and the first reference-signal resource is one reference-signal resource corresponding to the first index in a first reference-signal resource group; the first reference-signal resource group is one of the K reference-signal resource groups corresponding to the first resource block.

The present disclosure provides a second node for wireless communications, comprising:

a second processor, transmitting first information and a first signaling;

herein, the first information is used for determining K resource blocks, K being a positive integer greater than 1; the K resource blocks respectively correspond to K reference-signal resource groups, and any of the K reference-signal resource groups comprises a positive integer number of reference-signal resource(s); any reference-signal resource in the K reference-signal resource groups corresponds to one of M first-type indexes, M being a positive integer greater than 1; the first signaling is used for activating a first index in the M first-type indexes; a first resource block is any of the K resource blocks, a first reference-signal resource is used for determining a spatial relation of the first resource block, and the first reference-signal resource is one reference-signal resource corresponding to the first index in a first reference-signal resource group; the first reference-signal resource group is one of the K reference-signal resource groups corresponding to the first resource block.

In one embodiment, the present disclosure has the following advantages over conventional schemes:

information selected by employing TRP/panel simplifies beam management, and greatly reduces a signaling overhead and delay of beam management.

BRIEF DESCRIPTION OF THE DRAWINGS

Other features, objects and advantages of the present disclosure will become more apparent from the detailed description of non-restrictive embodiments taken in conjunction with the following drawings:

FIG. 9 illustrates a schematic diagram of a second radio signal and a third radio signal according to one embodiment of the present disclosure.

FIG. 12 illustrates a schematic diagram of a first reference-signal resource in S reference-signal resources according to one embodiment of the present disclosure.

FIG. 13 illustrates a schematic diagram of a second signaling according to one embodiment of the present disclosure.

FIG. 14 illustrates a schematic diagram of a first reference-signal resource and a spatial-domain filter of a first radio signal according to one embodiment of the present disclosure.

FIG. 15 illustrates a schematic diagram of second information according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
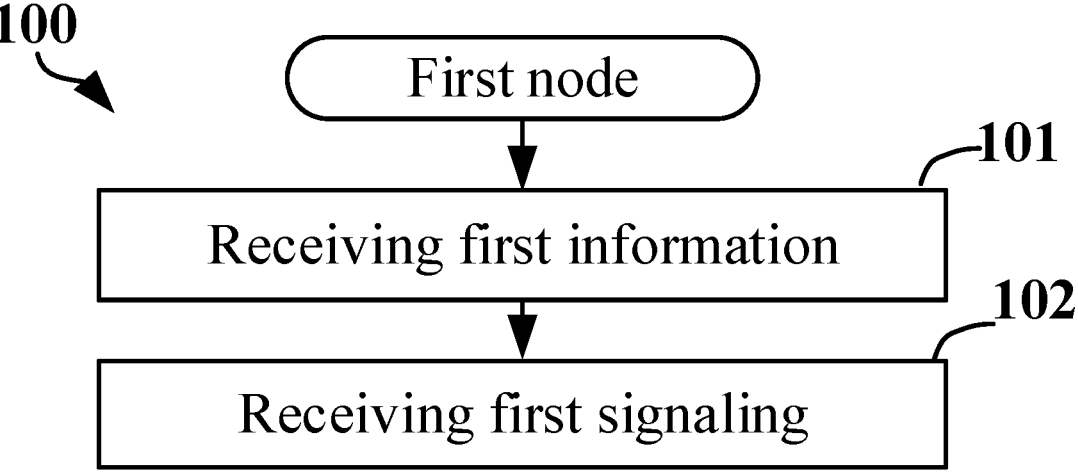
FIG. 1 illustrates a flowchart of first information and a first signaling according to one embodiment of the present disclosure.

Embodiment 1 illustrates a flowchart of first information and a first signaling according to one embodiment of the present disclosure, as shown in FIG. 1. In step 100 illustrated by FIG. 1, each box represents a step. Particularly, how steps marked by the boxes are arranged does not represent a chronological order of characteristics of these steps.

In Embodiment 1, the first node in the present disclosure receives first information in step 101; and receives a first signaling in step 102; herein, the first information is used for determining K resource blocks, K being a positive integer greater than 1; the K resource blocks respectively correspond to K reference-signal resource groups, and any of the K reference-signal resource groups comprises a positive integer number of reference-signal resource(s); any reference-signal resource in the K reference-signal resource groups corresponds to one of M first-type indexes, M being a positive integer greater than 1; the first signaling is used for activating a first index in the M first-type indexes; a first resource block is any of the K resource blocks, a first reference-signal resource is used for determining a spatial relation of the first resource block, and the first reference-signal resource is one reference-signal resource corresponding to the first index in a first reference-signal resource group; the first reference-signal resource group is one of the K reference-signal resource groups corresponding to the first resource block.

In one embodiment, the first information is carried by higher-layer signaling(s).

In one embodiment, the first information is carried by Radio Resource Control (RRC) signaling(s).

In one embodiment, the first information is carried by an RRC signaling.

In one embodiment, the first information is respectively carried by multiple RRC signalings.

In one embodiment, the first information comprises RRC message(s).

In one embodiment, the first information comprises an RRC message.

In one embodiment, the first information comprises multiple RRC messages.

In one embodiment, the first information comprises all or part of information of Information Element(s)(IE).

In one embodiment, the first information comprises all or part information of an IE.

In one embodiment, the first information comprises all or part information of multiple IEs.

In one embodiment, the first information comprises all or part of information of a ControlResourceSetIE.

In one embodiment, the first information comprises all or part of information of a SearchSpaceIE.

In one embodiment, the first information comprises all or part of information of a PUCCH-ConfigIE.

In one embodiment, the first information comprises all or part of information of a PUCCH-Resource.

In one embodiment, the first information comprises all or part of information of a PUCCH-ResourceSet.

In one embodiment, the first information comprises all or part of information of an SRS-ConfigIE.

In one embodiment, the first information comprises all or part of information of an SRS-Resource.

In one embodiment, the first information comprises all or part of information of an SRS-ResourceSet.

In one embodiment, the first information is UE-specific.

In one embodiment, the first information is semi-persistent.

In one embodiment, the first information indicates the K resource blocks.

In one embodiment, the first information explicitly indicates the K resource blocks.

In one embodiment, the first information implicitly indicates the K resource blocks.

In one embodiment, the first information is used for determining time-frequency resources occupied by the K resource blocks.

In one embodiment, the first information is used for determining time-frequency resources and code-domain resources occupied by the K resource blocks.

In one embodiment, the first information indicates that the K resource blocks respectively correspond to the K reference-signal resource groups.

In one embodiment, the first information indicates the K reference-signal resource groups.

In one embodiment, the first information indicates a reference-signal resource identifier of each reference-signal resource in the K reference-signal resource groups.

In one embodiment, the first information indicates corresponding relations between reference-signal resources in the K reference-signal resource groups and the M first-type indexes.

In one embodiment, the first information indicates a first-type index in the M first-type indexes corresponding to each reference-signal resource in the K reference-signal resource groups.

In one embodiment, the first information indicates a reference-signal resource identifier of each reference-signal resource in the K reference-signal resource groups and its corresponding first-type index in the M first-type indexes.

In one embodiment, the first signaling is a Medium Access Control layer Control Element (MACCE) signaling.

In one embodiment, the first signaling is a MAC CE command.

In one embodiment, the first signaling is a MAC CE activation command.

In one embodiment, the first signaling comprises a MAC CE.

In one embodiment, the first signaling does not comprise a first field, the first field indicating an identifier of one of the K resource blocks.

In one embodiment, the first signaling is a latest received signaling used for activating one of the M first-type indexes.

In one embodiment, the first signaling is used for activating only the first index in the M first-type indexes.

In one embodiment, the first signaling comprises a first bit string, the first bit string indicating the first index; and the first bit string comprises M bits.

In one subembodiment of the above embodiment, the first bit string consists of the M bits.

In one subembodiment of the above embodiment, the M bits respectively correspond to the M first-type indexes; and a bit corresponding to only the first index in the M bits is equal to a first bit value.

In one subembodiment of the above embodiment, the first bit value is equal to 1.

In one subembodiment of the above embodiment, the first bit value is equal to 0.

In one embodiment, one of the K resource blocks is a Sounding Reference Signal (SRS) resource.

In one embodiment, any of the K resource blocks is an SRS resource.

In one embodiment, one of the K resource blocks is an SRS resource set.

In one embodiment, any of the K resource blocks is an SRS resource set.

In one embodiment, one of the K resource blocks is a Physical Uplink Control Channel (PUCCH) resource.

In one embodiment, any of the K resource blocks is a PUCCH resource.

In one embodiment, one of the K resource blocks is a PUCCH resource set.

In one embodiment, any of the K resource blocks is a PUCCH resource set.

In one embodiment, one of the K resource blocks is a COntrol REsource SET (CORESET).

In one embodiment, any of the K resource blocks is a CORESET.

In one embodiment, the K resource blocks comprise an SRS resource and a PUCCH resource.

In one embodiment, the K resource blocks comprise an SRS resource, a PUCCH resource and a CORESET.

In one embodiment, an identifier of one of the K resource blocks is an SRS-ResourceId.

In one embodiment, an identifier of one of the K resource blocks is an SRS-ResourceSetId.

In one embodiment, an identifier of one of the K resource blocks is a PUCCH-ResourceId.

In one embodiment, an identifier of one of the K resource blocks is a PUCCH-ResourceSetId.

In one embodiment, an identifier of one of the K resource blocks is a ControlResourceSetId.

In one embodiment, any reference-signal resource in the K reference-signal resource groups corresponds to only one of the M first-type indexes.

In one embodiment, reference-signal resources in the K reference-signal resource groups comprise SRS resources.

In one embodiment, reference-signal resources in the K reference-signal resource groups comprise Channel-State Information Reference Signals (CSI-RS) resources.

In one embodiment, reference-signal resources in the K reference-signal resource groups comprise Synchronization Signal/Physical Broadcast Channel block (SS/PBCH Block) resources.

In one embodiment, reference-signal resource identifiers of reference-signal resources in the K reference-signal resource groups comprise an SRS-ResourceId.

In one embodiment, reference-signal resource identifiers of reference-signal resources in the K reference-signal resource groups comprise an NZP-CSI-RS-ResourceId.

In one embodiment, reference-signal resource identifiers of reference-signal resources in the K reference-signal resource groups comprise an SS/PBCH Block Resource indicator (SSBRI).

In one embodiment, reference-signal resource identifiers of reference-signal resources in the K reference-signal resource groups comprise an SSB-Index.

In one embodiment, the M first-type indexes are respectively M non-negative integers.

In one embodiment, the M first-type indexes are respectively 0 to M−1.

In one embodiment, any two of the M first-type indexes are different.

In one embodiment, the first index is one of the M first-type indexes.

In one embodiment, the first index is any of the M first-type indexes.

In one embodiment, for any given first-type index in the M first-type indexes, there exists one reference-signal resource in any of the K reference-signal resource groups corresponding to the given first-type index.

In one embodiment, only the first reference-signal resource in the first reference-signal resource group corresponds to the first index.

In one embodiment, the first reference-signal resource group comprises a reference-signal resource different from the first reference-signal resource corresponding to the first index.

In one embodiment, there exists one reference-signal resource group in the K reference-signal resource groups only comprising one reference-signal resource corresponding to the first index.

In one embodiment, there exists one reference-signal resource group in the K reference-signal resource groups comprising multiple reference-signal resources corresponding to the first index.

In one embodiment, the M first-type indexes are respectively used for identifying M panels.

In one subembodiment of the above embodiment, each of the M panels is deployed on the first node.

In one subembodiment of the above embodiment, each of the M panels is deployed on the second node in the present disclosure.

In one embodiment, the M first-type indexes are respectively used for identifying M antenna groups, and any of the M antenna groups comprises a positive integer number of antenna(s).

In one subembodiment of the above embodiment, each of the M antenna groups is deployed on the first node.

In one subembodiment of the above embodiment, each of the M antenna groups is deployed on the second node in the present disclosure.

In one subembodiment of the above embodiment, all antennas in any of the M antenna groups are connected to the baseband processor via a same Radio Frequency (RF) chain.

In one subembodiment of the above embodiment, antennas in different antenna groups of the M antenna groups are connected to the baseband processor via different RF chains.

In one subembodiment of the above embodiment, coherent transmissions cannot be performed among antennas in different antenna groups of the M antenna groups.

In one subembodiment of the above embodiment, coherent receptions cannot be performed among antennas in different antenna groups of the M antenna groups.

In one embodiment, the M first-type indexes are respectively used for identifying M TRPs.

In one embodiment, any reference-signal resource in the K reference-signal resource groups corresponds to one reference-signal resource identifier and one of the M first-type indexes.

In one embodiment, any of the M first-type indexes is not used for identifying any reference-signal resource in the K reference-signal resource groups.

In one embodiment, any reference-signal resource group in the K reference-signal resource groups comprises one reference-signal resource corresponding to the first index; after receiving the first signaling, a spatial relation of any of the K resource blocks is determined by one reference-signal resource in its corresponding reference-signal resource group corresponding to the first index.

In one embodiment, any reference-signal resource group in the K reference-signal resource groups comprises one reference-signal resource corresponding to the first index; after receiving the first signaling and before receiving another signaling used for activating one of the M first-type indexes, a spatial relation of any of the K resource blocks is determined by one reference-signal resource in its corresponding reference-signal resource group corresponding to the first index.

In one embodiment, after receiving the first signaling, the first reference-signal resource is used for determining a spatial relation of the first resource block.

In one embodiment, after receiving the first signaling, the first reference-signal resource is used for determining a spatial relation of the first resource block; before receiving the first signaling, the first reference-signal resource is not used for determining a spatial relation of the first resource block.

In one embodiment, after receiving the first signaling, the first reference-signal resource is used for determining a spatial relation of the first resource block; before receiving the first signaling, a second reference-signal resource is used for determining a spatial relation of the first resource block, and the second reference-signal resource corresponds to one of the M first-type indexes different from the first index.

In one embodiment, after receiving the first signaling, one reference-signal resource corresponding to the first index is used for determining a spatial relation of the first resource block.

In one embodiment, after receiving the first signaling, one reference-signal resource corresponding to the first index is used for determining a spatial relation of the first resource block; before receiving the first signaling, a spatial relation of the first resource block is unrelated to any reference-signal resource corresponding to the first index.

In one embodiment, the spatial relation refers to a spatial relation.

In one embodiment, the spatial relation of the first resource block comprises a spatial-domain filter for a radio signal transmitted within the first resource block.

In one embodiment, the spatial relation of the first resource block comprises a spatial-domain transmission filter for a radio signal transmitted within the first resource block.

In one embodiment, the spatial relation of the first resource block comprises a spatial-domain receive filter for a radio signal transmitted within the first resource block.

In one embodiment, the spatial relation of the first resource block comprises a TCI state of the first resource block.

In one embodiment, the spatial relation of the first resource block comprises Spatial Rx parameters of the first resource block.

In one embodiment, the first reference-signal resource being used for determining a spatial relation of the first resource block comprises that the first node uses a same spatial-domain filter for receiving a first reference signal and transmitting a radio signal within the first resource block; and the first reference-signal resource is reserved for the first reference signal.

In one embodiment, the first reference-signal resource being used for determining a spatial relation of the first resource block comprises that the first node uses a same spatial-domain filter for receiving a first reference signal and receiving a radio signal within the first resource block; and the first reference-signal resource is reserved for the first reference signal.

In one embodiment, the first reference-signal resource being used for determining a spatial relation of the first resource block comprises that the first node uses a same spatial-domain filter for transmitting a first reference signal and transmitting a radio signal within the first resource block; and the first reference-signal resource is reserved for the first reference signal.

In one embodiment, the first reference-signal resource being used for determining a spatial relation of the first resource block comprises that the first node uses a same spatial-domain filter for transmitting a first reference signal and receiving a radio signal within the first resource block; and the first reference-signal resource is reserved for the first reference signal.

In one embodiment, the first reference-signal resource being used for determining a spatial relation of the first resource block comprises that one transmitting antenna port of a first reference signal and one transmitting antenna port of a radio signal transmitted within the first resource block are QuasiCo-Located (QCL); and the first reference-signal resource is reserved for the first reference signal.

In one embodiment, the specific meaning of the QCL can be found in 3GPP TS38. 211, section 4.4.

In one embodiment, two antenna ports being QCL refers to that large-scale properties of a channel that a radio signal transmitted by one of the two antenna ports goes through can be used for inferring large-scale properties of a channel that a radio signal transmitted by the other one of the two antenna ports goes through.

In one embodiment, the large-scale properties include one or more of delay spread, Doppler spread, Doppler shift, average gain, average delay, and Spatial Rx parameters.

In one embodiment, the first resource block comprises a PUCCH resource, the first node uses a same spatial-domain filter for transmitting a first reference signal and transmitting a PUCCH within the first resource block; and the first reference-signal resource is reserved for the first reference signal.

In one embodiment, the first resource block comprises a PUCCH resource, the first node uses a same spatial-domain filter for receiving a first reference signal and transmitting a PUCCH within the first resource block; and the first reference-signal resource is reserved for the first reference signal.

In one embodiment, the first resource block comprises an SRS resource, the first node uses a same spatial-domain filter for transmitting a first reference signal and transmitting an SRS within the first resource block; and the first reference-signal resource is reserved for the first reference signal.

In one embodiment, the first resource block comprises an SRS resource, the first node uses a same spatial-domain filter for receiving a first reference signal and transmitting an SRS within the first resource block; and the first reference-signal resource is reserved for the first reference signal.

In one embodiment, the first resource block comprises a CORESET, and the first node assumes that a DMRS antenna port associated with a reception of the PDCCH within the first resource block and a first reference signal are QCL; and the first reference-signal resource is reserved for the first reference signal.

Embodiment 2

Figure 2:
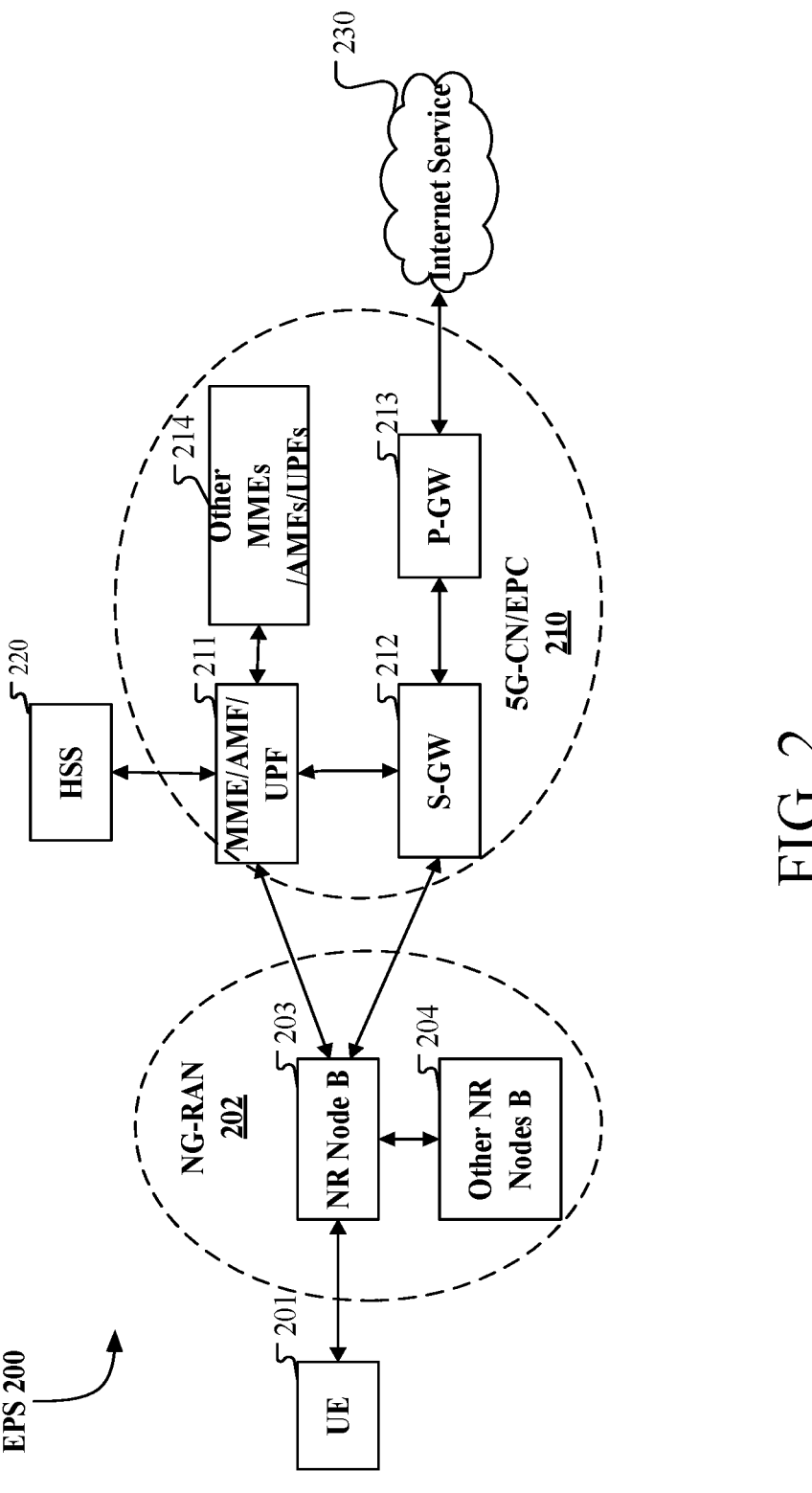
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2.

FIG. 2 is a diagram illustrating a network architecture 200 of Long-Term Evolution (LTE), Long-Term Evolution Advanced (LTE-A) and future 5G systems. The LTE, LTE-A and future 5G systems network architecture 200 may be called an Evolved Packet System (EPS) 200. The EPS 200 may comprise one or more UEs 201, an NG-RAN 202, a 5G-Core Network/Evolved Packet Core (5G-CN/EPC) 210, a Home Subscriber Server (HSS) 220 and an Internet Service 230. Herein, UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), air vehicles, narrow-band physical network devices, machine-type communication devices, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1 interface. The 5G-CN/EPC 210 comprises a Mobility Management Entity/Authentication Management Field/User Plane Function (MME/AMF/UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the 5G-CN/EPC 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions.

The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the second node in the present disclosure comprises the gNB 203.

In one embodiment, the first node in the present disclosure comprises the UE 201.

In one embodiment, the UE in the present disclosure comprises the UE 201.

In one embodiment, the base station in the present disclosure comprises the gNB 203.

In one embodiment, a transmitter of the first information in the present disclosure comprises the gNB 203.

In one embodiment, a receiver of the first information in the present disclosure comprises the UE 201.

In one embodiment, a transmitter of the first signaling in the present disclosure comprises the gNB 203.

In one embodiment, a receiver of the first signaling in the present disclosure comprises the UE 201.

In one embodiment, a transmitter of the second radio signal in the present disclosure comprises the UE 201.

In one embodiment, a receiver of the second radio signal in the present disclosure comprises the gNB 203.

In one embodiment, a transmitter of the second signaling in the present disclosure comprises the gNB 203.

In one embodiment, a receiver of the second signaling in the present disclosure comprises the UE 201.

In one embodiment, a transmitter of the first radio signal in the present disclosure comprises the UE 201.

In one embodiment, a receiver of the first radio signal in the present disclosure comprises the gNB 203.

In one embodiment, a transmitter of the first radio signal in the present disclosure comprises the gNB 203.

In one embodiment, a receiver of the first radio signal in the present disclosure comprises the UE 201.

In one embodiment, a transmitter of the second information in the present disclosure comprises the UE 201.

In one embodiment, a receiver of the second information in the present disclosure comprises the gNB 203.

Embodiment 3

Figure 3:
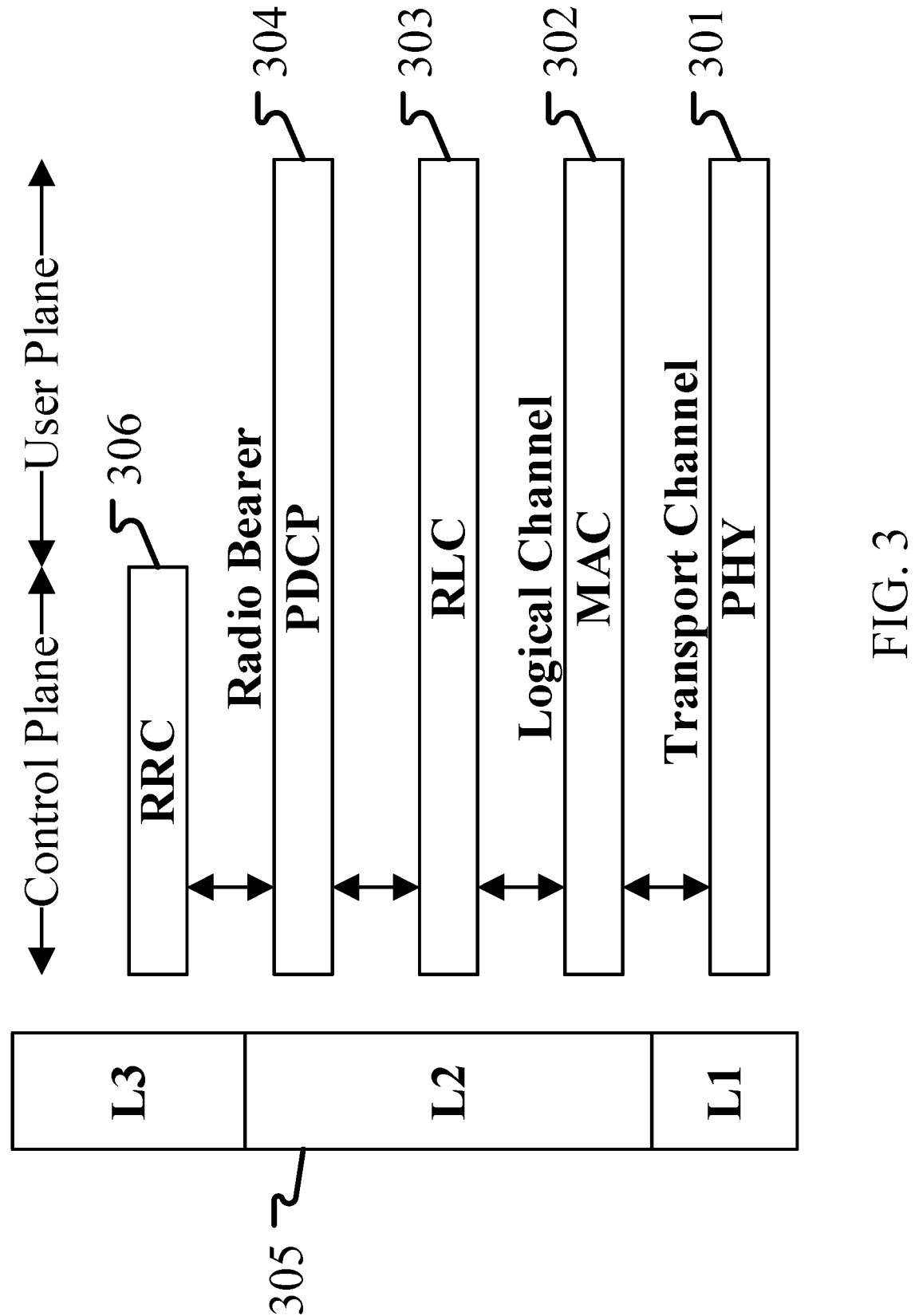
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to one embodiment of the present disclosure, as shown in FIG. 3.

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resources block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information in the present disclosure is generated by the RRC sublayer 306.

In one embodiment, the first signaling in the present disclosure is generated by the MAC sublayer 302.

In one embodiment, the second radio signal in the present disclosure is generated by the PHY 301.

In one embodiment, the second signaling in the present disclosure is generated by the MAC sublayer 302.

In one embodiment, the first radio signal in the present disclosure is generated by the PHY 301.

In one embodiment, the second information in the present disclosure is generated by the RRC sublayer 306.

Embodiment 4

Figure 4:
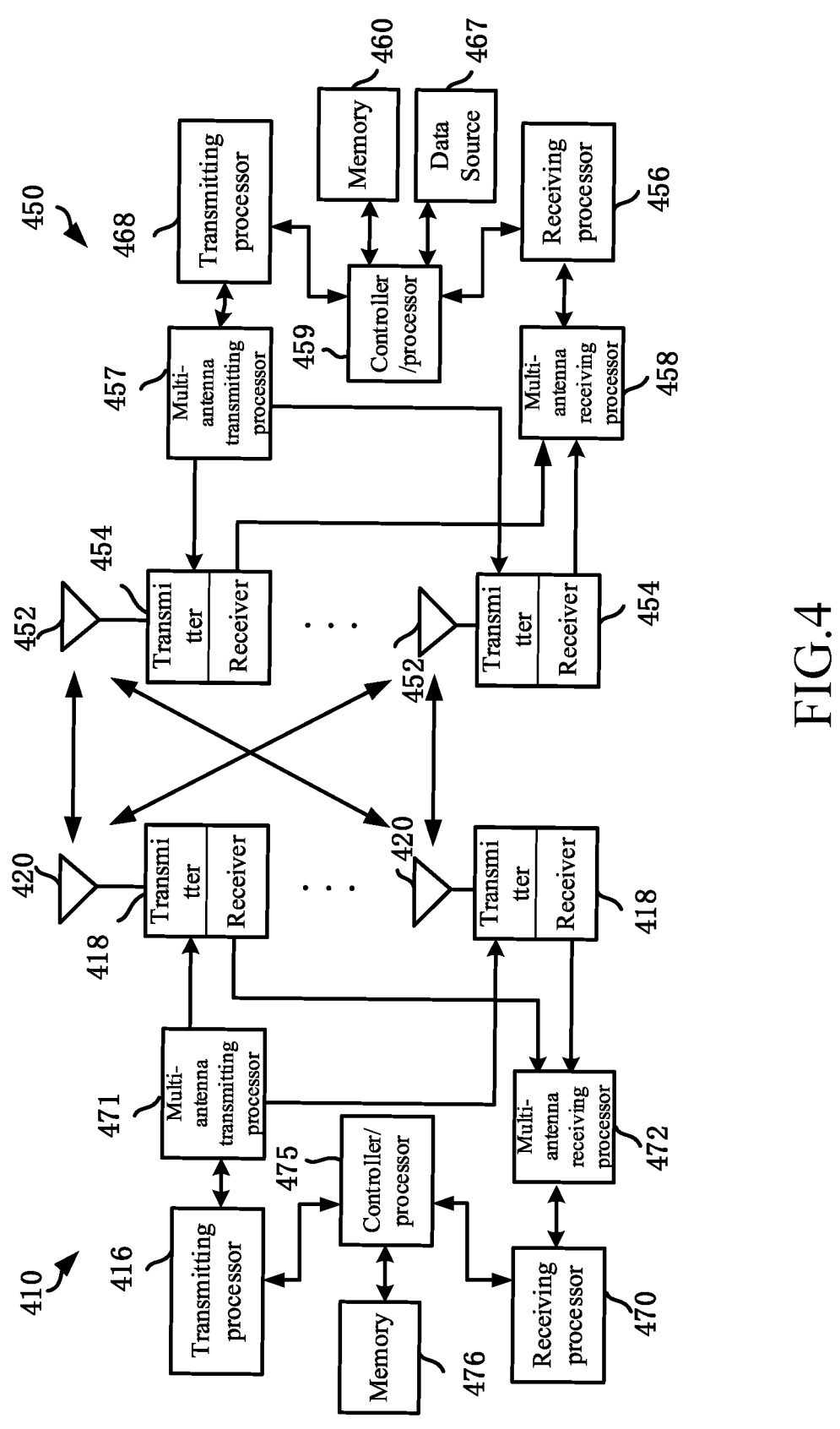
FIG. 4 illustrates a schematic diagram of a first communication device and a second communication device according to one embodiment of the present disclosure.

Embodiment 4 illustrates a schematic diagram of a first communication device and a second communication device according to one embodiment of the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer.

In DL transmission, the controller/processor 475 provides header compression, encryption, packet segmentation and reordering, and multiplexing between a logical channel and a transport channel, and radio resource allocation for the second communication device 450 based on various priorities. The controller/processor 475 is also in charge of HARQ operation, retransmission of a lost packet, and a signaling to the second communication node 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink (DL) transmission, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL transmission, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for HARQ operation, retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. the controller/processor 475 provides de-multiplexing between a transport channel and a logical channel, packet reassembling, decryption, header decompression, control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives the first information in the present disclosure; and receives the first signaling in the present disclosure; herein, the first information is used for determining K resource blocks, K being a positive integer greater than 1; the K resource blocks respectively correspond to K reference-signal resource groups, and any of the K reference-signal resource groups comprises a positive integer number of reference-signal resource(s); any reference-signal resource in the K reference-signal resource groups corresponds to one of M first-type indexes, M being a positive integer greater than 1; the first signaling is used for activating a first index in the M first-type indexes; a first resource block is any of the K resource blocks, a first reference-signal resource is used for determining a spatial relation of the first resource block, and the first reference-signal resource is one reference-signal resource corresponding to the first index in a first reference-signal resource group; and the first reference-signal resource group is one of the K reference-signal resource groups corresponding to the first resource block.

In one embodiment, the second communication device 450 comprises a memory that stores a computer readable instruction program. The computer readable instruction program generates an action when executed by at least one processor. The action includes: receiving the first information in the present disclosure; and receiving the first signaling in the present disclosure; herein, the first information is used for determining K resource blocks, K being a positive integer greater than 1; the K resource blocks respectively correspond to K reference-signal resource groups, and any of the K reference-signal resource groups comprises a positive integer number of reference-signal resource(s); any reference-signal resource in the K reference-signal resource groups corresponds to one of M first-type indexes, M being a positive integer greater than 1; the first signaling is used for activating a first index in the M first-type indexes; a first resource block is any of the K resource blocks, a first reference-signal resource is used for determining a spatial relation of the first resource block, and the first reference-signal resource is one reference-signal resource corresponding to the first index in a first reference-signal resource group; the first reference-signal resource group is one of the K reference-signal resource groups corresponding to the first resource block.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits the first information in the present disclosure; and transmits the first signaling in the present disclosure; herein, the first information is used for determining K resource blocks, K being a positive integer greater than 1; the K resource blocks respectively correspond to K reference-signal resource groups, and any of the K reference-signal resource groups comprises a positive integer number of reference-signal resource(s); any reference-signal resource in the K reference-signal resource groups corresponds to one of M first-type indexes, M being a positive integer greater than 1; the first signaling is used for activating a first index in the M first-type indexes; a first resource block is any of the K resource blocks, a first reference-signal resource is used for determining a spatial relation of the first resource block, and the first reference-signal resource is one reference-signal resource corresponding to the first index in a first reference-signal resource group; the first reference-signal resource group is one of the K reference-signal resource groups corresponding to the first resource block.

In one embodiment, the first communication device 410 comprises a memory that stores a computer readable instruction program. The computer readable instruction program generates an action when executed by at least one processor. The action includes: transmitting the first information in the present disclosure; and transmitting the first signaling in the present disclosure; herein, the first information is used for determining K resource blocks, K being a positive integer greater than 1; the K resource blocks respectively correspond to K reference-signal resource groups, and any of the K reference-signal resource groups comprises a positive integer number of reference-signal resource(s); any reference-signal resource in the K reference-signal resource groups corresponds to one of M first-type indexes, M being a positive integer greater than 1; the first signaling is used for activating a first index in the M first-type indexes; a first resource block is any of the K resource blocks, a first reference-signal resource is used for determining a spatial relation of the first resource block, and the first reference-signal resource is one reference-signal resource corresponding to the first index in a first reference-signal resource group; the first reference-signal resource group is one of the K reference-signal resource groups corresponding to the first resource block.

In one embodiment, the second node in the present disclosure comprises the first communication device 410.

In one embodiment, the first node comprises the second communication device 450 in the present disclosure.

In one embodiment, at least one of the antenna 452, the receiver 454, the receiving processor 456, the multi-antenna receiving processor 458, the controller/processor 459, the memory 460, or the data source 467 is used for receiving the first information in the present disclosure; at least one of the antenna 420, the transmitter 418, the transmitting processor 416, the multi-antenna transmitting processor 471, the controller/processor 475, or the memory 476 is used for transmitting the first information in the present disclosure.

In one embodiment, at least one of the antenna 452, the receiver 454, the receiving processor 456, the multi-antenna receiving processor 458, the controller/processor 459, the memory 460, or the data source 467 is used for receiving the first signaling in the present disclosure; at least one of the antenna 420, the transmitter 418, the transmitting processor 416, the multi-antenna transmitting processor 471, the controller/processor 475, or the memory 476 is used for transmitting the first signaling in the present disclosure.

In one embodiment, at least one of the antenna 420, the receiver 418, the receiving processor 470, the multi-antenna receiving processor 472, the controller/processor 475, or the memory 476 is used for receiving the second radio signal in the present disclosure; at least one of the antenna 452, the transmitter 454, the transmitting processor 468, the multi-antenna transmitting processor 457, the controller/processor 459, the memory 460, or the data source 467 is used for transmitting the second radio signal in the present disclosure.

In one embodiment, at least one of the antenna 452, the receiver 454, the receiving processor 456, the multi-antenna receiving processor 458, the controller/processor 459, the memory 460, or the data source 467 is used for receiving the second signaling in the present disclosure; at least one of the antenna 420, the transmitter 418, the transmitting processor 416, the multi-antenna transmitting processor 471, the controller/processor 475, or the memory 476 is used for transmitting the second signaling in the present disclosure.

In one embodiment, at least one of the antenna 420, the receiver 418, the receiving processor 470, the multi-antenna receiving processor 472, the controller/processor 475, or the memory 476 is used for receiving the first radio signal in the present disclosure in the first resource block in the present disclosure; at least one of the antenna 452, the transmitter 454, the transmitting processor 468, the multi-antenna transmitting processor 457, the controller/processor 459, the memory 460, or the data source 467 is used for transmitting the first radio signal in the present disclosure in the first resource block in the present disclosure.

In one embodiment, at least one of the antenna 452, the receiver 454, the receiving processor 456, the multi-antenna receiving processor 458, the controller/processor 459, the memory 460, or the data source 467 is used for receiving the first radio signal in the present disclosure in the first resource block in the present disclosure; at least one of the antenna 420, the receiver 418, the receiving processor 416, the multi-antenna transmitting processor 471, the controller/processor 475, or the memory 476 is used for transmitting the first radio signal in the present disclosure in the first resource block in the present disclosure.

In one embodiment, at least one of the antenna 420, the receiver 418, the receiving processor 470, the multi-antenna receiving processor 472, the controller/processor 475, or the memory 476 is used for receiving the second information in the present disclosure; at least one of the antenna 452, the transmitter 454, the transmitting processor 468, the multi-antenna transmitting processor 457, the controller/processor 459, the memory 460, or the data source 467 is used for transmitting the second information in the present disclosure.

Embodiment 5

Figure 5:
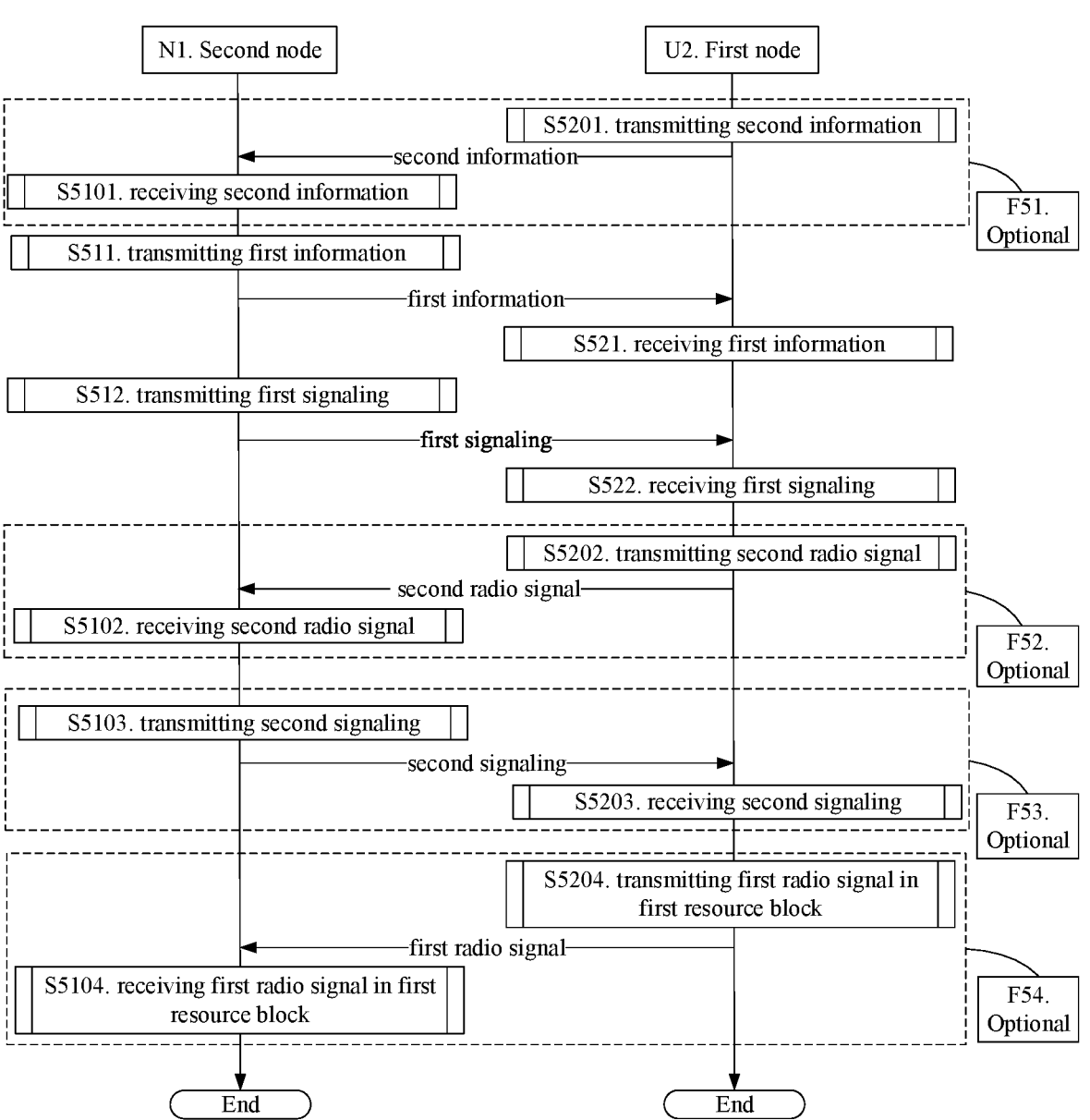
FIG. 5 illustrates a flowchart of wireless communications according to one embodiment of the present disclosure.

Embodiment 5 illustrates a flowchart of wireless communications according to one embodiment in the present disclosure, as shown in FIG. 5. In FIG. 5, a second node N1 and a first node U2 are communication nodes transmitted via air interfaces. In FIG. 5, steps in F51 and F54 are respectively optional.

The second node N1 receives second information in step S5101; transmits first information in step S511; transmits a first signaling in step S512; receives a second radio signal in step S5102; transmits a second signaling in step S5103; and receives a first radio signal in a first resource block in step S5104.

The first node U2 transmits second information in step S5201; receives first information in step S521; receives a first signaling in step S522; transmits a second radio signal in step S5202; receives a second signaling in step S5203; and transmits a first radio signal in a first resource block in step S5204.

In Embodiment 5, the first information is used by the first node U2 for determining K resource blocks, K being a positive integer greater than 1; the K resource blocks respectively correspond to K reference-signal resource groups, and any of the K reference-signal resource groups comprises a positive integer number of reference-signal resource(s); any reference-signal resource in the K reference-signal resource groups corresponds to one of M first-type indexes, M being a positive integer greater than 1; the first signaling is used by the second node N1 for activating a first index in the M first-type indexes; a first resource block is any of the K resource blocks, a first reference-signal resource is used by the first node U2 for determining a spatial relation of the first resource block, and the first reference-signal resource is one reference-signal resource corresponding to the first index in a first reference-signal resource group; the first reference-signal resource group is one of the K reference-signal resource groups corresponding to the first resource block; the second radio signal indicates that a third radio signal is correctly received, and the third radio signal carries the first signaling; the first reference-signal resource is used by the first node U2 for determining a spatial-domain filter of the first radio signal; and the second information indicates the M.

In one embodiment, the first node U2 is the first node in the present disclosure.

In one embodiment, the second node N1 is the second node in the present disclosure.

In one embodiment, from a first time, the first reference-signal resource is used by the first node U2 for determining a spatial relation of the first resource block; the first time is later than a time unit where the second radio signal is located, and a time interval between the first time and the time unit where the second radio signal is located is a first time interval.

In one embodiment, each of S reference-signal resources in the first reference-signal resource group corresponds to the first index, S being a positive integer greater than 1; and a position of the first reference-signal resource in the S reference-signal resources is default.

In one subembodiment of the above embodiment, the box F53 in FIG. 5 does not exist.

In one embodiment, each of S reference-signal resources in the first reference-signal resource group corresponds to the first index, S being a positive integer greater than 1; and the second signaling is used by the second node N1 for activating the first reference-signal resource out of the S reference-signal resources.

In one subembodiment of the above embodiment, the box F53 in FIG. 5 exists.

In one embodiment, the first node in the present disclosure transmits the first radio signal in the first resource block, and the operating action in the present disclosure is transmitting.

In one subembodiment of the above embodiment, the first resource block comprises an SRS resource.

In one subembodiment of the above embodiment, the first resource block comprises a PUCCH resource.

In one embodiment, the second node in the present disclosure receives the first radio signal in the first resource block, and the performing action in the present disclosure is receiving.

In one embodiment, the first information is transmitted on a downlink physical layer data channel (i.e., a downlink channel capable of carrying physical layer data).

In one embodiment, the first information is respectively transmitted on multiple downlink physical layer data channels (i.e., downlink channels capable of carrying physical layer data).

In one embodiment, the first information is transmitted on a Physical Downlink Shared CHannel (PDSCH).

In one embodiment, the first information is respectively transmitted on multiple PDSCHs.

In one embodiment, the first information is transmitted on a Physical Sidelink Shared Channel (PSSCH).

In one embodiment, the first signaling is transmitted on a downlink physical layer data channel (i.e., a downlink channel capable of carrying physical layer data).

In one embodiment, the first signaling is transmitted on a PDSCH.

In one embodiment, the first signaling is transmitted on a PSSCH.

In one embodiment, the second radio signal is transmitted on an uplink physical layer data channel (i.e., an uplink channel capable of carrying physical layer data).

In one embodiment, the second radio signal is transmitted on a Physical Uplink Shared CHannel (PUSCH).

In one embodiment, the second radio signal is transmitted on an uplink physical layer control channel (that is, an uplink channel capable of carrying a physical layer signaling only).

In one embodiment, the second radio signal is transmitted on a Physical Uplink Control CHannel (PUCCH).

In one embodiment, the third radio signal is transmitted on a downlink physical layer data channel (i.e., a downlink channel capable of carrying physical layer data).

In one embodiment, the third radio signal is transmitted on a PDSCH.

In one embodiment, the third radio signal is transmitted on a PSSCH.

In one embodiment, the second signaling is transmitted on a downlink physical layer data channel (i.e., a downlink channel capable of carrying physical layer data).

In one embodiment, the second signaling is transmitted on a PDSCH.

In one embodiment, the second signaling is transmitted on a PSSCH.

In one embodiment, the first radio signal is transmitted on an uplink physical layer control channel (that is, an uplink channel capable of carrying a physical layer signaling only), the operating action in the present disclosure is transmitting, and the performing action in the present disclosure is receiving.

In one embodiment, the first radio signal is transmitted on a PUCCH, the operating action in the present disclosure is transmitting, and the performing action in the present disclosure is receiving.

Embodiment 6

Figure 6:
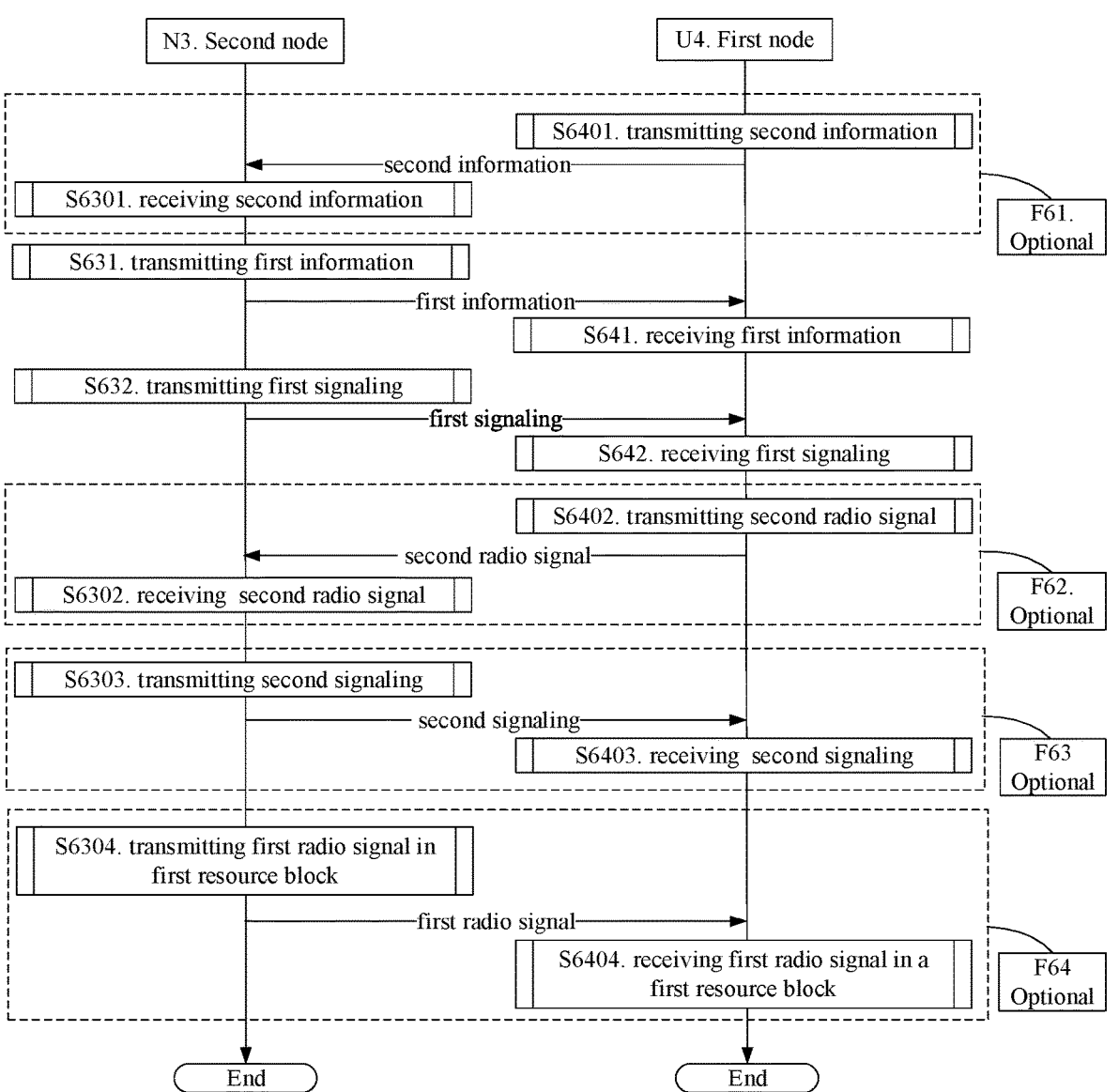
FIG. 6 illustrates a flowchart of wireless communications according to one embodiment of the present disclosure.

Embodiment 6 illustrates a flowchart of wireless communications according to one embodiment in the present disclosure, as shown in FIG. 6. In FIG. 6, a second node N3 and a first node U4 are communication nodes transmitted via air interfaces. In FIG. 6, steps in F61 and F64 are respectively optional.

The second node N3 receives second information in step S6301; transmits first information in step S631; transmits a first signaling in step S632; receives a second radio signal in step S6302; transmits a second signaling in step S6303; and transmits a first radio signal in a first resource block in step S6304.

The first node U4 transmits second information in step S6401; receives first information in step S641; receives a first signaling in step S642; transmits a second radio signal in step S6402; receives a second signaling in step S6403; and receives a first radio signal in a first resource block in step S6404.

In one embodiment, the first node U4 is the first node in the present disclosure.

In one embodiment, the second node N3 is the second node in the present disclosure.

In one embodiment, the first node in the present disclosure receives the first radio signal in the first resource block, and the operating action in the present disclosure is receiving.

In one subembodiment of the above embodiment, the first resource block comprises a CORESET.

In one embodiment, the second node in the present disclosure transmits the first radio signal in the first resource block, and the performing action in the present disclosure is transmitting.

In one embodiment, the first radio signal is transmitted on a downlink physical layer control channel (i.e., a downlink channel capable of carrying a physical layer signaling), the operating action in the present disclosure is receiving, and the performing action in the present disclosure is transmitting.

In one embodiment, the first radio signal is transmitted on a Physical Downlink Control Channel (PDCCH), the operating action in the present disclosure is receiving, and the performing action in the present disclosure is transmitting.

Embodiment 7

Figure 7:
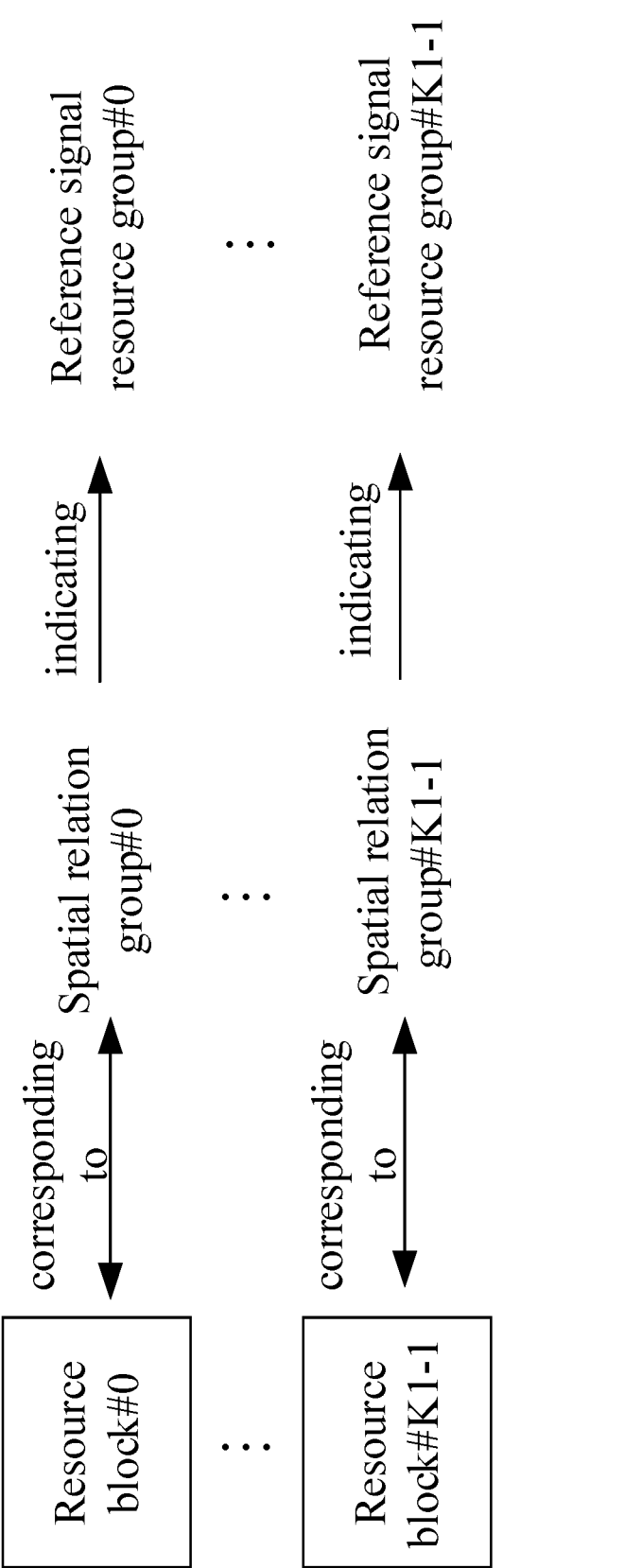
FIG. 7 illustrates a schematic diagram of K resource blocks and K reference-signal resource groups according to one embodiment of the present disclosure.

Embodiment 7 illustrates a schematic diagram of K resource blocks and K reference-signal resource groups according to one embodiment of the present disclosure, as shown in FIG. 7. In Embodiment 7, K1 resource block(s) in the K resource blocks corresponds (respectively correspond) to K1 spatial relation group(s); K1 is a positive integer no greater than the K, any of the K1 spatial relation group(s) comprises a positive integer number of spatial relation(s); the K1 spatial relation(s) indicates (respectively indicate) K1 reference-signal resource group(s) in the K reference-signal resource group(s), and the K1 reference-signal resource group(s) corresponds (respectively correspond) to the K1 resource block(s). In FIG. 7, indexes of the K1 resource block(s), the K1 spatial relation group(s) and the K1 reference-signal resource group(s) are respectively #0, . . . , #K1-1.

In one embodiment, the K1 is equal to the K.

In one embodiment, the K1 is less than the K.

In one embodiment, any spatial relation of the K1 spatial relation group(s) corresponds to one of the M first-type indexes.

In one embodiment, any spatial relation of the K1 spatial relation group(s) corresponds to one spatial relation identifier and one of the M first-type indexes.

In one subembodiment of the above embodiment, a spatial relation identifier corresponding to a spatial relation in the K1 spatial relation group(s) comprises a PUCCH-SpatialRelationInfold.

In one embodiment, the first information in the present disclosure indicates the K1 spatial relation group(s).

In one embodiment, the first information in the present disclosure indicates that the K1 resource block(s) corresponds (receptively correspond) to the K1 spatial relation group(s).

In one embodiment, the first information in the present disclosure comprises first sub-information, and the first sub-information indicates the K1 spatial relation group(s).

In one subembodiment of the above embodiment, the first sub-information comprises all or part of information in SRS-SpatialRelationInfo.

In one subembodiment of the above embodiment, the first sub-information comprises all or part of information in a spatialRelationInfoToAddModList filed in a PUCCH-ConfigIE.

In one subembodiment of the above embodiment, the first sub-information comprises all or part of information in a PUCCH-SpatialRelationInfoIE.

In one subembodiment of the above embodiment, the first sub-information indicates a reference-signal resource iden-tifier of each reference-signal resource in the K1 reference-signal resource group(s).

Embodiment 8

Figure 8:
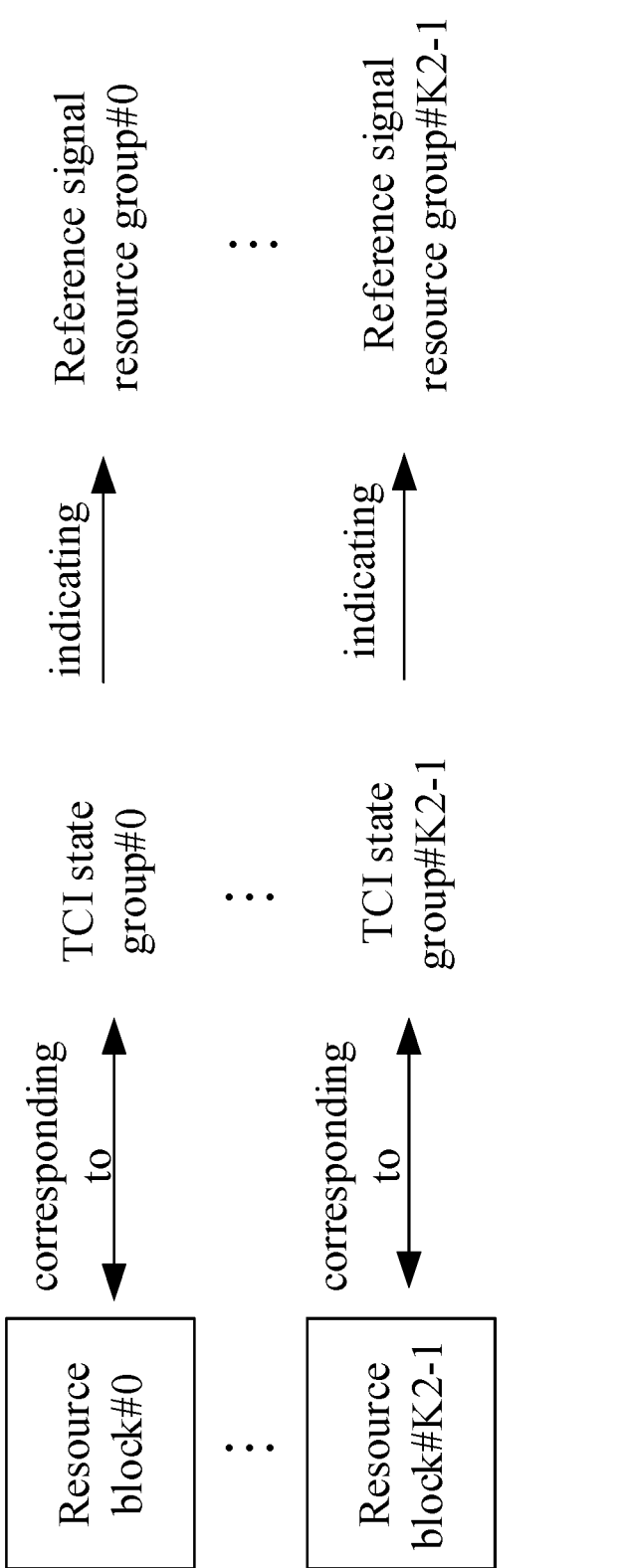
FIG. 8 illustrates a schematic diagram of K resource blocks and K reference-signal resource groups according to one embodiment of the present disclosure.

Embodiment 8 illustrates a schematic diagram of K resource blocks and K reference-signal resource groups according to one embodiment of the present disclosure, as shown in FIG. 8. In Embodiment 8, K2 resource block(s) in the K resource blocks corresponds (respectively correspond) to K2 TCI state group(s), K2 being a positive integer no greater than the K, and any of the K2 state group(s) comprises a positive integer number of TCI state(s); the K2 TCI state group(s) indicates (respectively indicate) K2 ref-erence-signal resource group(s) in the K reference-signal resource groups, and the K2 reference-signal resource group(s) corresponds (respectively correspond) to the K2 resource block(s).

In one embodiment, the K2 is equal to the K.

In one embodiment, the K2 is less than the K.

In one embodiment, any TCI state in the K2 TCI state group(s) corresponds to one of the M first-type indexes.

In one embodiment, any TCI state in the K2 TCI state group(s) corresponds to a TCI state identifier and one of the M first-type indexes.

In one subembodiment of the above embodiment, a TCI state identifier of any TCI state in the K2 TCI state group(s) is a TCI-StateId.

In one embodiment, the first information in the present disclosure indicates the K2 TCI state group(s).

In one embodiment, the first information in the present disclosure indicates that the K2 resource block(s) corre-sponds (respectively correspond) to the K2 TCI state group(s).

In one embodiment, the first information in the present disclosure comprises second sub-information, the second sub-information indicating the K2 TCI state group(s).

In one subembodiment of the above embodiment, the second sub-information comprises all or part of information of a tci-StatesPDCCH-ToAddList field in a ControlRe-sourceSetIE.

In one subembodiment of the above embodiment, the second sub-information comprises all or part of information of a TCI-StateIE.

In one subembodiment of the above embodiment, the second sub-information indicates a reference-signal resource identifier of each reference-signal resource in the K2 reference-signal resource group(s).

Embodiment 9

Figure 9:
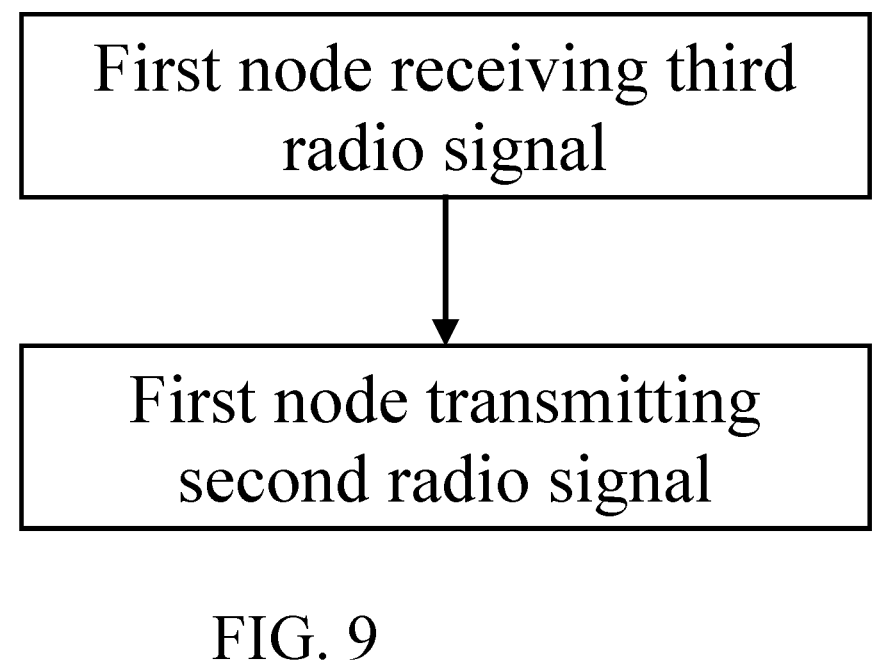

Embodiment 9 illustrates a schematic diagram of a second radio signal and a third radio signal according to one embodiment of the present disclosure, as shown in FIG. 9. In Embodiment 9, the first node in the present disclosure receives the third radio signal, and transmits the second radio signal; the second radio signal indicates that the third radio signal is correctly received, and the third radio signal carries the first signaling in the present disclosure.

In one embodiment, the second radio signal carries UplinkControlInformation (UCI).

In one embodiment, the second radio signal carries Hybrid Automatic Repeat reQuest-Acknowledgement (HARQ-ACK).

In one embodiment, the third radio signal is transmitted on a PDSCH, and a second radio signal indicates that a PDSCH carries the third radio signal is correctly received.

In one embodiment, the third radio signal is transmitted on a PDSCH, and the first signaling comprises a MAC CE carried by a PDSCH that carries the third radio signal.

In one embodiment, the third radio signal is transmitted on a PDSCH, and a MAC PDU of a PDSCH that carries the third radio signal comprises the first signaling.

In one embodiment, the third radio signal is transmitted on a PSSCH, and a MAC PDU of a PSSCH that carries the third radio signal comprises the first signaling.

In one embodiment, the third radio signal is transmitted on a PSSCH, and the first signaling comprises a MAC CE carried by a PSSCH that carries the third radio signal.

In one embodiment, the third radio signal carries a Trans-port Block (TB).

Embodiment 10

Figure 10:
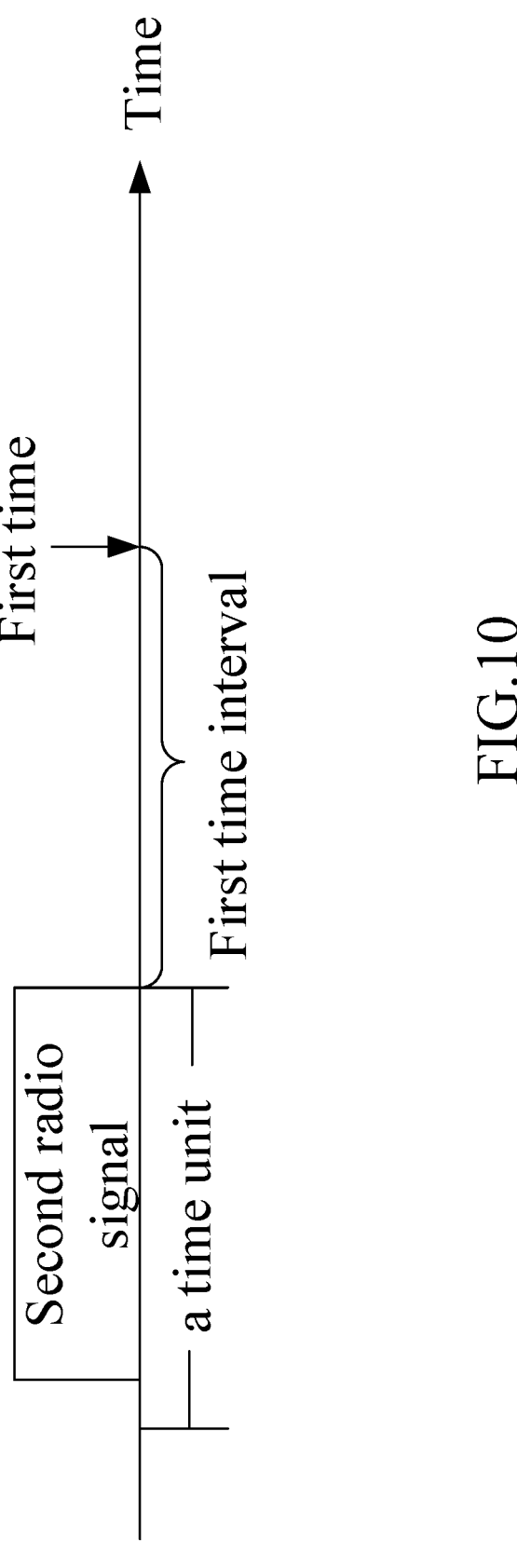
FIG. 10 illustrates a schematic diagram of a first time according to one embodiment of the present disclosure.

Embodiment 10 illustrates a schematic diagram of a first time according to one embodiment of the present disclosure, as shown in FIG. 10. In Embodiment 10, the first time is later than a time unit where the second radio signal in the present disclosure is located, and a time interval between the first time and the time unit where the second radio signal is located is a first time interval in the present disclosure. From the first time, the first reference-signal resource in the present disclosure is used for determining a spatial relation in the first resource block in the present disclosure.

In one embodiment, the time unit is a slot.

In one embodiment, the time unit is a subframe.

In one embodiment, the time unit is a continuous duration.

In one embodiment, the time interval between the first time and the time unit where the second radio signal is located being a first time interval comprises that a time interval between the first time and an end time of the time unit where the second radio signal is located is the first time interval.

In one embodiment, a time interval between the first time and an end time of the slot where the second radio signal is located is the first time interval.

In one embodiment, the first time interval lasts as long as 3 ms.

In one embodiment, the first time interval lasts over 3 ms.

In one embodiment, the first time interval is fixed.

In one embodiment, the first time interval is pre-defined.

In one embodiment, the first time interval is configured by a higher-layer signaling.

In one embodiment, the first time interval is semi-stati-cally configured.

In one embodiment, time-domain resources occupied by the second radio signal are within the time unit where the second radio signal is located.

In one embodiment, the second radio signal occupies a last multicarrier symbol in the time unit where the second radio signal is located.

In one embodiment, a command for activating a first index in the M first-type indexes in the present disclosure takes effect from the first time.

In one embodiment, form the first time, a spatial relation of any of the K resource blocks in the present disclosure is determined by a reference-signal resource corresponding to the first index in the present disclosure in its corresponding reference-signal resource group.

Embodiment 11

Figure 11:
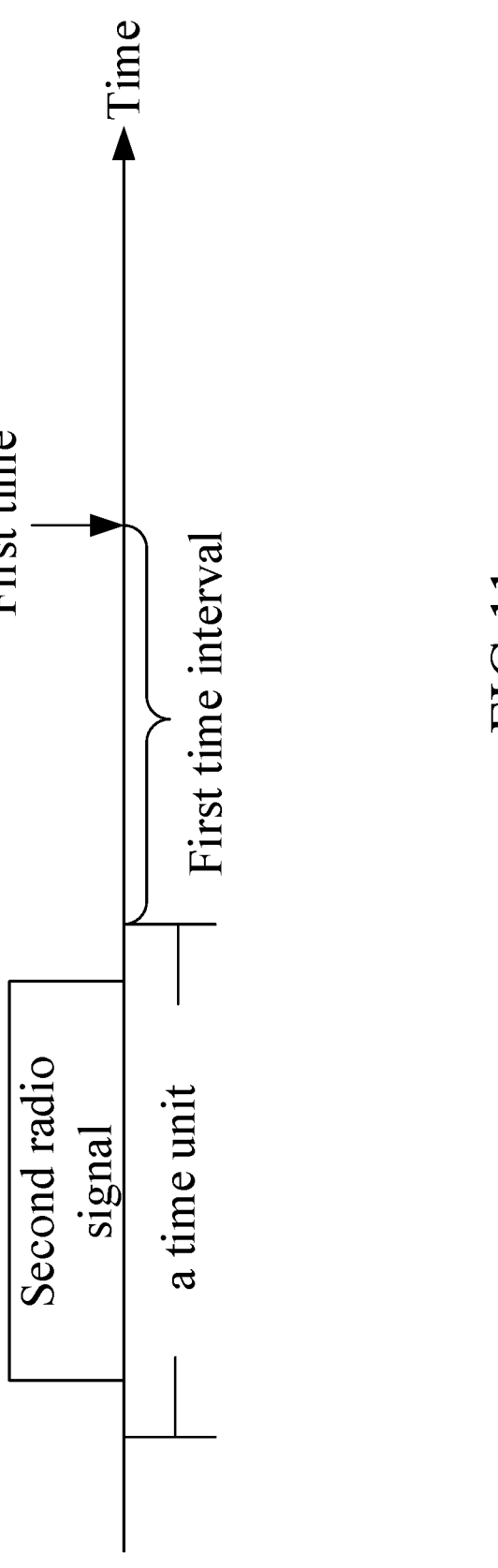
FIG. 11 illustrates a schematic diagram of a first time according to one embodiment of the present disclosure.

Embodiment 11 illustrates a schematic diagram of a first time according to one embodiment of the present disclosure, as shown in FIG. 11. In Embodiment 11, the first time is later than a time unit where the second radio signal in the present disclosure is located, and a time interval between the first time and the time unit where the second radio signal is located is a first time interval in the present disclosure.

In one embodiment, the second radio signal does not occupy a last multicarrier symbol in the time unit where the second radio signal is located.

Embodiment 12

Figure 12:
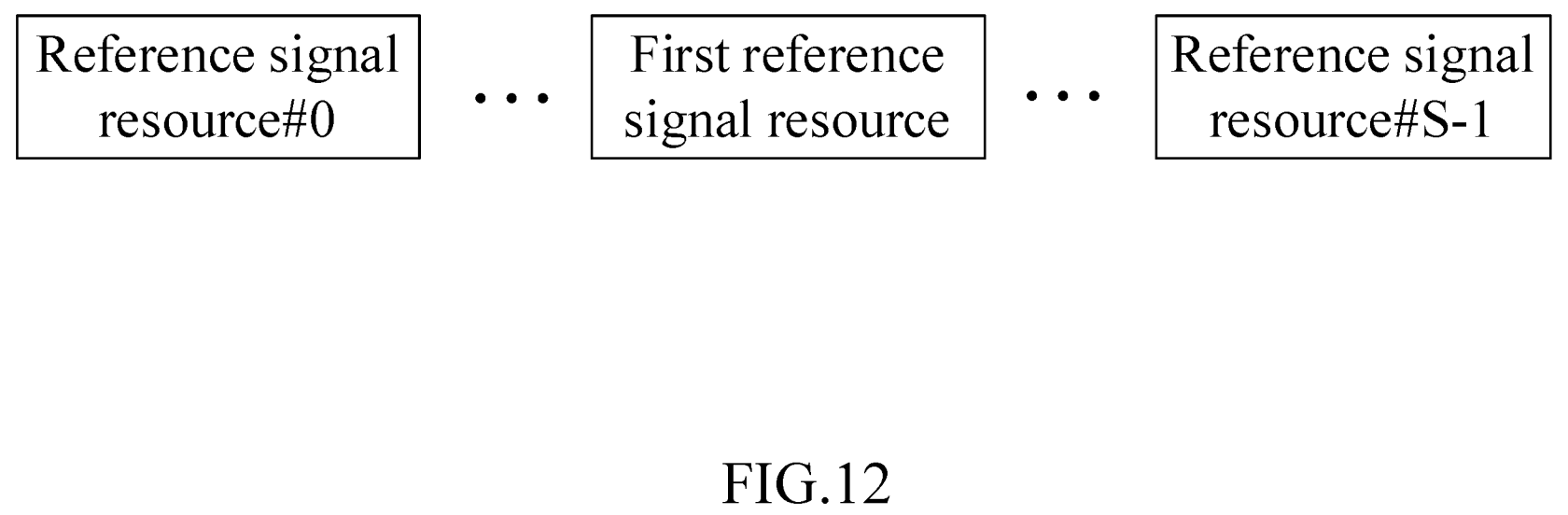

Embodiment 12 illustrates a schematic diagram of a first reference-signal resource in S reference-signal resources according to one embodiment of the present disclosure, as shown in FIG. 12. In Embodiment 12, each of the S reference-signal resources in the first reference-signal resource group in the present disclosure corresponds to the first index in the present disclosure; and a position of the first reference-signal resource in the S reference-signal resources is default. In FIG. 12, indexes of the S reference-signal resources are respectively #0, . . . , #S−1.

In one embodiment, the phrase that a position of the first reference-signal resource in the S reference-signal resources is default means that a reference-signal resource identifier of the first reference-signal resource is a minimum one of reference-signal resource identifiers of the S reference-signal resources.

In one embodiment, the phrase that a position of the first reference-signal resource in the S reference-signal resources is default means that a reference-signal resource identifier of the first reference-signal resource is a maximum one of reference-signal resource identifiers of the S reference-signal resources.

In one embodiment, the phrase that a position of the first reference-signal resource in the S reference-signal resources is default comprises that the position of the first reference-signal resource in the S reference-signal resources does not need to be indicated by a dynamic signaling.

In one embodiment, the phrase that a position of the first reference-signal resource in the S reference-signal resources is default comprises that the position of the first reference-signal resource in the S reference-signal resources is configured by a higher-layer signaling.

In one embodiment, the phrase that a position of the first reference-signal resource in the S reference-signal resources is default comprises that the position of the first reference-signal resource in the S reference-signal resources is pre-configured.

In one embodiment, the phrase that a position of the first reference-signal resource in the S reference-signal resources is default comprises that the first information in the present disclosure indicates a first identification sequence, and the first identification sequence comprises reference-signal resource identifiers of the S reference-signal resources; a position of a reference-signal resource identifier of the first reference-signal resource in the first identification sequence is located in front of a reference-signal resource identifier of other any reference-signal resource in the S reference-signal resources.

In one embodiment, the phrase that a position of the first reference-signal resource in the S reference-signal resources is default comprises that the S reference-signal resources respectively correspond to S spatial relations, and a position of a spatial relation corresponding to the first reference-signal resource in the S spatial relations is default.

In one subembodiment of the above embodiment, the first information in the present disclosure indicates a second identification sequence, the second identification sequence comprises spatial-relation identifiers corresponding to the S spatial relations, a position of a spatial-relation identifier of a spatial relation corresponding to the first reference-signal resource in the second identification sequence is located in front of a spatial-relation identifier of other any spatial relation in the S spatial relations.

In one embodiment, the phrase that a position of the first reference-signal resource in the S reference-signal resources is default comprises that the S reference-signal resources respectively correspond to S TCI states, and a position of a TCI state corresponding to the first reference-signal resource in the S TCI states is default.

In one subembodiment of the present disclosure, the first information in the present disclosure indicates a third identification sequence, the third identification sequence comprises TCI state identifiers corresponding to the S TCI states, a position of a TCI state identifier of a TCI state corresponding to the first reference-signal resource in the third identification sequence is located in the front of a TCI state identifier of other any TCI state in the S TCI states.

Embodiment 13

Figure 13:
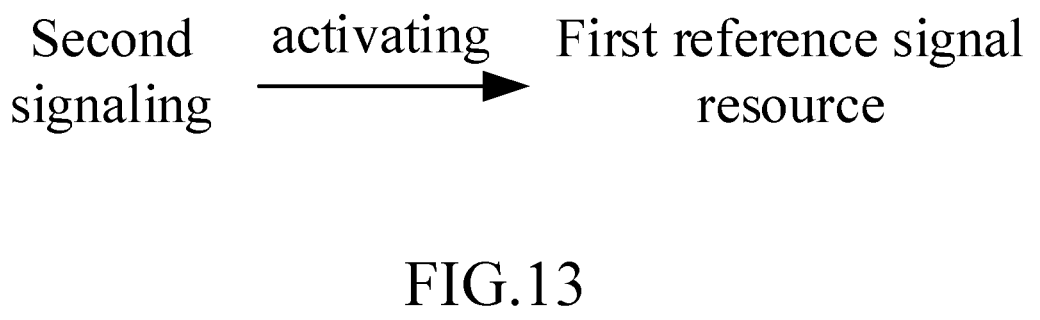

Embodiment 13 illustrates a schematic diagram of a second signaling according to one embodiment of the present disclosure, as shown in FIG. 13. In Embodiment 13, the second signaling is used for activating the first reference-signal resource in the present disclosure out of the S reference-signal resources in the present disclosure.

In one embodiment, the second signaling is a MAC CE signaling.

In one embodiment, the second signaling is a MAC CE command.

In one embodiment, the second signaling is a MAC CE activation command.

In one embodiment, the second signaling comprises a MAC CE.

In one embodiment, the second signaling is a latest received signaling used for activating a reference-signal resource in the first reference-signal resource group.

In one embodiment, the second signaling is used for activating only the first reference-signal resource in the S reference-signal resources.

In one embodiment, the second signaling comprises a second bit string, and the second bit string indicates the first reference-signal resource out of the S reference-signal resources; and a number of bits comprised in the second bit string is equal to the S.

In one subembodiment of the above embodiment, S bits in the second bit string respectively correspond to the S reference-signal resources; and bit(s) in the S bits only corresponding to the first reference-signal resources is(are) equal to a second bit value.

In one reference embodiment of the above subembodiment, the second bit value is equal to 1.

In one reference embodiment of the above subembodiment, the second bit value is equal to 0.

In one embodiment, a start time of time resources occupied by the second signaling is after the first time in the present disclosure.

In one embodiment, after receiving the second signaling, the first reference-signal resource is used for determining a spatial relation of the first resource block in the present disclosure.

In one embodiment, the first node in the present disclosure transmits a fourth radio signal, the fourth radio signal being used for determining that a PDSCH carrying the second signaling is correctly received.

In one subembodiment of the above embodiment, from the second time, the first reference-signal resource is used for determining the spatial relation of the first resource block in the present disclosure; the second time is later than the time unit where the fourth radio signal is located, and a time interval between the second time and the time unit where the fourth radio signal is located in a second time interval.

In one reference embodiment of the above subembodiment, the second time interval lasts as long as 3 ms.

In one reference embodiment of the above subembodiment, the second time interval is fixed.

Embodiment 14

Embodiment 14 illustrates a schematic diagram of a first reference-signal resource and a spatial-domain filter of a first radio signal according to one embodiment of the present disclosure, as shown in FIG. 14. In Embodiment 14, the first reference-signal resource is used for determining a spatial-domain filter of the first radio signal.

In one embodiment, the first radio signal comprises an SRS.

In one embodiment, the first radio signal comprises UCI.

In one embodiment, the first radio signal comprises DCI.

In one embodiment, the spatial-domain filter refers to a spatial-domain filter.

In one embodiment, the spatial-domain filter comprises a spatial-domain transmission filter.

In one embodiment, the spatial-domain filter comprises a spatial-domain receive filter.

In one embodiment, the phrase that the first reference-signal resource is used for determining a spatial-domain filter of the first radio signal comprises that the first node in the present disclosure uses a same spatial-domain filter for receiving a first reference signal and transmitting the first radio signal; and the first reference-signal resource is reserved for the first reference signal.

In one embodiment, the phrase that the first reference-signal resource is used for determining a spatial-domain filter of the first radio signal comprises that the first node in the present disclosure uses a same spatial-domain filter for receiving a first reference signal and the first radio signal; and the first reference-signal resource is reserved for the first reference signal.

In one embodiment, the phrase that the first reference-signal resource is used for determining a spatial-domain filter of the first radio signal comprises that the first node in the present disclosure uses a same spatial-domain filter for transmitting a first reference signal and the first radio signal; and the first reference-signal resource is reserved for the first reference signal.

In one embodiment, the phrase that the first reference-signal resource is used for determining a spatial-domain filter of the first radio signal comprises that the first node in the present disclosure uses a same spatial-domain filter for transmitting a first reference signal and receiving the first radio signal; and the first reference-signal resource is reserved for the first reference signal.

In one embodiment, the phrase that the first reference-signal resource is used for determining a spatial-domain filter of the first radio signal comprises that a transmitting antenna port of a first reference signal and a transmitting antenna port of the first radio signal are QCL; and the first reference-signal resource is reserved for the first reference signal.

In one embodiment, the phrase that the first reference-signal resource is used for determining a spatial-domain filter of the first radio signal comprises that a transmitting antenna port of a first reference signal and a transmitting antenna port of the first radio signal are QCL and correspond to QCL-TypeD; and the first reference-signal resource is reserved for the first reference signal.

In one embodiment, the specific meaning of the QCL-TypeD can be found in 3GPP TS38.214, section 5.1.5.

Embodiment 15

Figure 15:
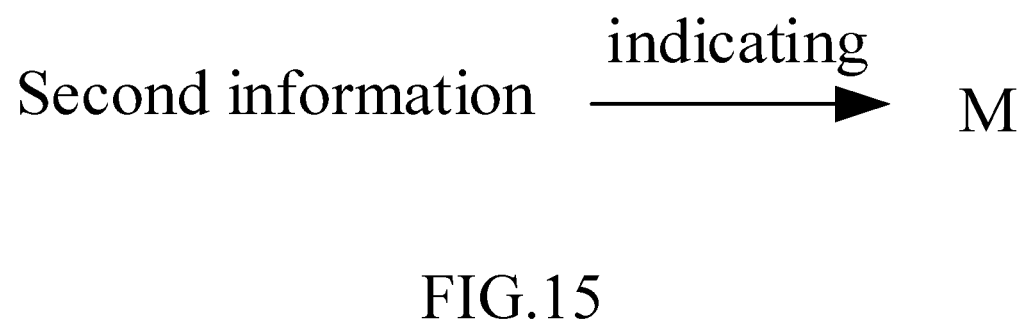

Embodiment 15 illustrates a schematic diagram of second information according to one embodiment of the present disclosure, as shown in FIG. 15. In Embodiment 15, the second information indicates the M in the present disclosure.

In one embodiment, the second information is carried by a higher-layer signaling.

In one embodiment, the second information comprises all or part of information in a UE capability IE.

In one embodiment, the second information is carried by a UE capability IE.

In one embodiment, the second information comprises a UECapabilityInformation message.

In one embodiment, the second information is transmitted on an uplink physical layer data channel (that is, an uplink channel capable of carrying physical layer data).

In one embodiment, the second information is transmitted on a PUSCH.

Embodiment 16

Figure 16:
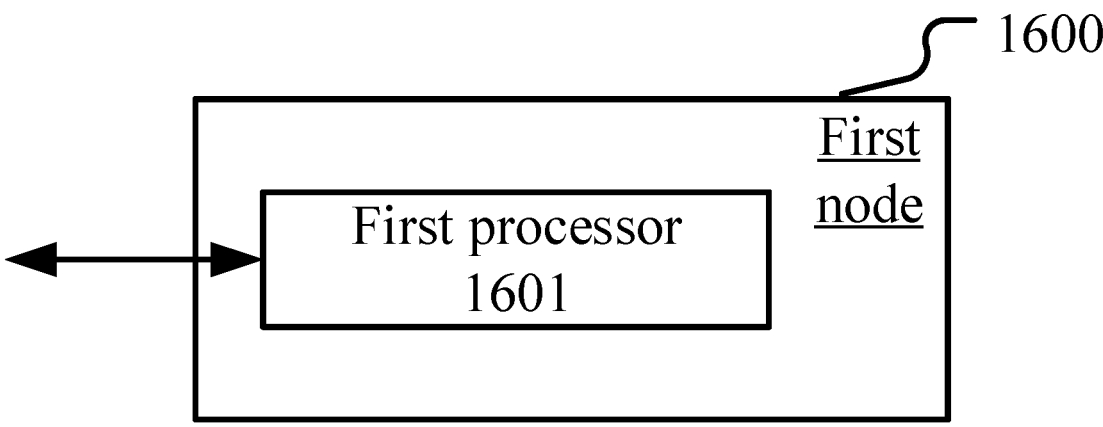
FIG. 16 illustrates a structure block diagram of a processing device in a first node according to one embodiment of the present disclosure.

Embodiment 16 illustrates a structure block diagram of a processing device in a first node according to one embodiment of the present disclosure, as shown in FIG. 16. In FIG. 16, the processing device 1600 in the first node comprises a first processor 1601.

In Embodiment 16, the first processor 1601 receives first information and a first signaling.

In Embodiment 16, the first information is used for determining K resource blocks, K being a positive integer greater than 1; the K resource blocks respectively correspond to K reference-signal resource groups, and any of the K reference-signal resource groups comprises a positive integer number of reference-signal resource(s); any reference-signal resource in the K reference-signal resource groups corresponds to one of M first-type indexes, M being a positive integer greater than 1; the first signaling is used for activating a first index in the M first-type indexes; a first resource block is any of the K resource blocks, a first reference-signal resource is used for determining a spatial relation of the first resource block, and the first reference-signal resource is one reference-signal resource corresponding to the first index in a first reference-signal resource group; the first reference-signal resource group is one of the K reference-signal resource groups corresponding to the first resource block.

In one embodiment, the first processor 1601 transmits a second radio signal; herein, the second radio signal indicates that a third radio signal is correctly received, and the third radio signal carries the first signaling.

In one embodiment, from a first time, the first reference-signal resource is used for determining the spatial relation of the first resource block; the first time is later than a time unit where the second radio signal is located, and a time interval between the first time and the time unit where the second radio signal is located is a first time interval.

In one embodiment, each of S reference-signal resources in the first reference-signal resource group corresponds to the first index, S being a positive integer greater than 1; and a position of the first reference-signal resource in the S reference-signal resources is default.

In one embodiment, the first processor 1601 receives a second signaling; herein, each of S reference-signal resources in the first reference-signal resource group corresponds to the first index, S being a positive integer greater than 1; and the second signaling is used for activating the first reference-signal resource out of the S reference-signal resources.

In one embodiment, the first processor 1601 operates a first radio signal in the first resource block; herein, the first reference-signal resource is used for determining a spatial-domain filter of the first radio signal; the operating action is transmitting, or the operating action is receiving.

In one embodiment, the first processor 1601 transmits a first radio signal in the first resource block; herein, the first reference-signal resource is used for determining a spatial-domain filter of the first radio signal.

In one embodiment, the first processor 1601 receives a first radio signal in the first resource block; herein, the first reference-signal resource is used for determining a spatial-domain filter of the first radio signal.

In one embodiment, the first processor 1601 transmits second information; herein, the second information indicates the M.

In one embodiment, the first node 1600 is a UE.

In one embodiment, the first node 1600 is a relay node.

In one embodiment, the first processor 1601 comprises at least one of the antenna 452, the receiver/transmitter 454, the transmitting processor 468, the multi-antenna transmitting processor 457, the controller/processor 459, the memory 460 or the data source 467 in Embodiment 4.

Embodiment 17

Figure 17:
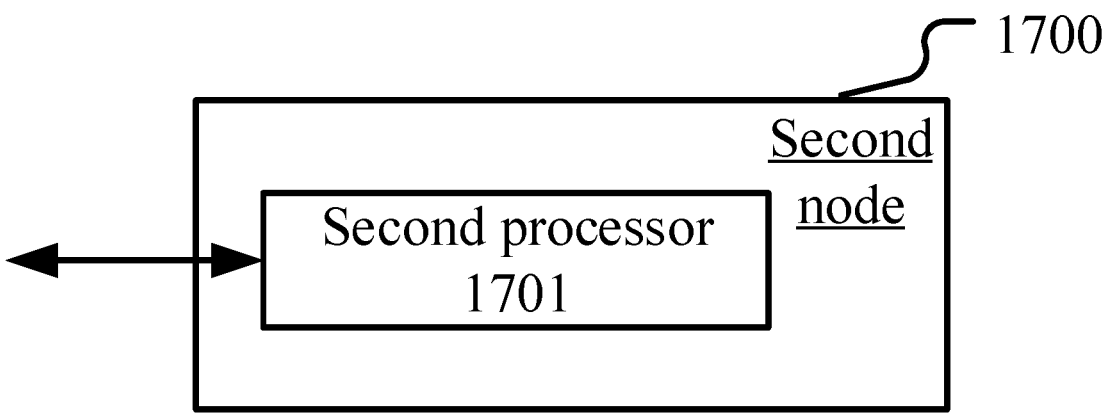
FIG. 17 illustrates a structure block diagram of a processing device in a second node according to one embodiment of the present disclosure.

Embodiment 17 illustrates a structure block diagram of a processing device in a second node according to one embodiment of the present disclosure. as shown in FIG. 17. In FIG. 17, the processing device 1700 in the second node comprises a second processor 1701.

In Embodiment 17, the second processor 1701 transmits first information and a first signaling.

In Embodiment 17, the first information is used for determining K resource blocks, K being a positive integer greater than 1; the K resource blocks respectively correspond to K reference-signal resource groups, and any of the K reference-signal resource groups comprises a positive integer number of reference-signal resource(s); any reference-signal resource in the K reference-signal resource groups corresponds to one of M first-type indexes, M being a positive integer greater than 1; the first signaling is used for activating a first index in the M first-type indexes; a first resource block is any of the K resource blocks, a first reference-signal resource is used for determining a spatial relation of the first resource block, and the first reference-signal resource is one reference-signal resource corresponding to the first index in a first reference-signal resource group; the first reference-signal resource group is one of the K reference-signal resource groups corresponding to the first resource block.

In one embodiment, the second processor 1701 receives a second radio signal; herein, the second radio signal indicates that a third radio signal is correctly received, and the third radio signal carries the first signaling.

In one embodiment, from a first time, the first reference-signal resource is used for determining the spatial relation of the first resource block; the first time is later than a time unit where the second radio signal is located, and a time interval between the first time and the time unit where the second radio signal is located is a first time interval.

In one embodiment, each of S reference-signal resources in the first reference-signal resource group corresponds to the first index, S being a positive integer greater than 1; and a position of the first reference-signal resource in the S reference-signal resources is default.

In one embodiment, the second processor 1701 transmits a second signaling; herein, each of S reference-signal resources in the first reference-signal resource group corresponds to the first index, S being a positive integer greater than 1; and the second signaling is used for activating the first reference-signal resource out of the S reference-signal resources.

In one embodiment, the second processor 1701 performs a first radio signal in the first resource block; herein, the first reference-signal resource is used for determining a spatial-domain filter of the first radio signal; the performing action is receiving, or, the performing action is transmitting.

In one embodiment, the second processor 1701 receives a first radio signal in the first resource block; herein, the first reference-signal resource is used for determining a spatial-domain filter of the first radio signal.

In one embodiment, the second processor 1701 transmits a first radio signal in the first resource block; herein, the first reference-signal resource is used for determining a spatial-domain filter of the first radio signal.

In one embodiment, the second processor 1701 also receives second information; herein, the second information indicates the M.

In one embodiment, the second node 1700 is a base station.

In one embodiment, the second node 1700 is a relay node.

In one embodiment, the second processor 1701 comprises at least one of the antenna 420, the transmitter/receiver 418, the transmitting processor 416, the receiving processor 470, the multi-antenna transmitting processor 471, the multi-antenna receiving processor 472, the controller/processor 475 or memory 476 in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive air-planes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A user equipment (UE) configured for wireless communications, the UE comprising:
a processor; and
a receiver configured to receive a first indication in Radio Resource Control (RRC) signaling, which indicates: at least two control resource sets (CORESETs) and, for each CORESET of the at least two CORESETs, a Transmission Configuration Indication (TCI) state group including one or more TCI states;
wherein a corresponding first-type index of a plurality of first-type indices relates each TCI state to a corresponding reference-signal resource, wherein each TCI state and the corresponding reference-signal resource are used to determine a spatial relation for physical downlink control channel (PDCCH) reception in a corresponding CORESET, and wherein a reference-signal resource group corresponds to each TCI state group, and each reference-signal resource group comprises one or more Channel State Information Reference Signal (CSI-RS) resources or one or more Synchronization Signal/Physical Broadcast Channel (SS/PBCH) resources; and
the receiver further configured to receive a medium access control layer control element (MAC CE) that activates an index of the plurality of first-type indices;
wherein, in response to the MAC CE, the UE sets for each of the at least two CORESETs, the spatial relation for PDCCH reception according to the TCI state and the corresponding reference-signal resource that correspond to the activated index.

2. The UE of claim 1, further comprising a transmitter configured to transmit a hybrid automatic repeat request acknowledgement (HARQ-ACK) that indicates that a signal carrying the MAC CE is correctly received; and
following a time interval that follows the HARQ-ACK, spatial reception parameters of the at least two CORESETs are determined by a reference-signal resource corresponding to each CORESET that corresponds to the activated index.

3. The UE of claim 1, wherein:
a position of the reference-signal resource corresponding to the activated index for each CORESET is a default position; and
a reference-signal resource identifier of any reference-signal resource in the reference-signal resource groups is a Non-Zero Power (NZP)-CSI-RS-ResourceId or Synchronization Signal Block (SSB)-Index.

4. The UE of claim 1, wherein:
a Demodulation Reference Signal (DMRS) antenna port associated with a reception of a PDCCH within at least one of the at least two CORESETs is Quasi-Co-Located with a reference signal for which the reference-signal resource corresponding to the activated index is reserved.

5. A base station configured for wireless communications, the base station comprising:
a processor; and
a transmitter configured to transmit, to a user equipment (UE), a first indication in Radio Resource Control (RRC) signaling, which indicates: at least two control resource sets (CORESETs) and, for each CORESET of the at least two CORESETs, a Transmission Configuration Indication (TCI) state group including one or more TCI states;
wherein a corresponding first-type index of a plurality of first-type indices relates each TCI state to a corresponding reference-signal resource, wherein each TCI state and the corresponding reference-signal resource are used to determine a spatial relation for physical downlink control channel (PDCCH) reception in a corresponding CORESET, and wherein a reference-signal resource group corresponds to each TCI state group, and each reference-signal resource group comprises one or more Channel State Information Reference Signal (CSI-RS) resources or one or more Synchronization Signal/Physical Broadcast Channel (SS/PBCH) resources; and
the transmitter further configured to transmit a medium access control layer control element (MAC CE) that activates an index of the plurality of first-type indices;
wherein the MAC CE indicates, for each of the at least two CORESETs, the spatial relation for PDCCH transmission according to the TCI state and the corresponding reference-signal resource that correspond to the activated index.

6. The base station of claim 5, further comprising a receiver configured to receive a hybrid automatic repeat request acknowledgement (HARQ-ACK) that indicates that a signal carrying the MAC CE is correctly received; and
following a time interval that follows the HARQ-ACK, spatial reception parameters of the at least two CORESETs are based on a reference-signal resource corresponding to each CORESET that corresponds to the activated index.

7. The base station of claim 5, wherein:
a position of the reference-signal resource corresponding to the activated index for each CORESET is a default position; and
a reference-signal resource identifier of any reference-signal resource in the reference-signal resource groups is a Non-Zero Power (NZP)-CSI-RS-ResourceId or Synchronization Signal Block (SSB)-Index.

8. The base station of claim 5, wherein:
a Demodulation Reference Signal (DMRS) antenna port associated with a reception of a PDCCH within at least one of the at least two CORESETs is Quasi-Co-Located with a reference signal for which the reference-signal resource corresponding to the activated index is reserved.

9. A method performed by a user equipment (UE), the method comprising:
receiving a first indication in Radio Resource Control (RRC) signaling, which indicates: at least two control resource sets (CORESETs) and, for each CORESET of the at least two CORESETs, a Transmission Configuration Indication (TCI) state group including one or more TCI states;

wherein a corresponding first-type index of a plurality of first-type indices relates each TCI state to a corresponding reference-signal resource, wherein each TCI state and the corresponding reference-signal resource are used to determine a spatial relation for physical downlink control channel (PDCCH) reception in a corresponding CORESET, and wherein a reference-signal resource group corresponds to each TCI state group, and each reference-signal resource group comprises one or more Channel State Information Reference Signal (CSI-RS) resources or one or more Synchronization Signal/Physical Broadcast Channel (SS/PBCH) resources; and receiving a medium access control layer control element (MAC CE) that activates an index of the plurality of first-type indices;

wherein, in response to the MAC CE, the UE sets for each of the at least two CORESETs, the spatial relation for PDCCH reception according to the TCI state and the corresponding reference-signal resource that correspond to the activated index.

10. The method of claim 9, further comprising:

transmitting a hybrid automatic repeat request acknowledgement (HARQ-ACK) that indicates that a signal carrying the MAC CE is correctly received; and following a time interval that follows the HARQ-ACK, spatial reception parameters of the at least two CORESETs are determined by a reference-signal resource corresponding to each CORESET that corresponds to the activated index.

11. The method of claim 9, wherein:

a position of the reference-signal resource corresponding to the activated index for each CORESET is a default position; and a reference-signal resource identifier of any reference-signal resource in the reference-signal resource groups is a Non-Zero Power (NZP)-CSI-RS-ResourceId or Synchronization Signal Block (SSB)-Index.

12. The method of claim 9, wherein:

a Demodulation Reference Signal (DMRS) antenna port associated with a reception of a PDCCH within at least one of the at least two CORESETs is Quasi-Co-Located with a reference signal for which the reference-signal resource corresponding to the activated index is reserved.

13. A method performed by a base station, the method comprising:

transmitting, to a user equipment (UE), a first indication in Radio Resource Control (RRC) signaling, which indicates: at least two control resource sets (CORESETs) and, for each CORESET of the at least two CORESETs, a Transmission Configuration Indication (TCI) state group including one or more TCI states;

wherein a corresponding first-type index of a plurality of first-type indices relates each TCI state to a corresponding reference-signal resource, wherein each TCI state and the corresponding reference-signal resource are used to determine a spatial relation for physical downlink control channel (PDCCH) reception in a corresponding CORESET, and wherein a reference-signal resource group corresponds to each TCI state group, and each reference-signal resource group comprises one or more Channel State Information Reference Signal (CSI-RS) resources or one or more Synchronization Signal/Physical Broadcast Channel (SS/PBCH) resources; and transmitting a medium access control layer control element (MAC CE) that activates an index of the plurality of first-type indices;

wherein the MAC CE indicates, for each of the at least two CORESETs, the spatial relation for PDCCH transmission according to the TCI state and the corresponding reference-signal resource that correspond to the activated index.

14. The method of claim 13, further comprising:

receiving a hybrid automatic repeat request acknowledgement (HARQ-ACK) that indicates that a signal carrying the MAC CE is correctly received; and following a time interval that follows the HARQ-ACK, spatial reception parameters of the at least two CORESETs are based on a reference-signal resource corresponding to each CORESET that corresponds to the activated index.

15. The method of claim 13, wherein:

a position of the reference-signal resource corresponding to the activated index for each CORESET is a default position; and a reference-signal resource identifier of any reference-signal resource in the reference-signal resource groups is a Non-Zero Power (NZP)-CSI-RS-ResourceId or Synchronization Signal Block (SSB)-Index.

16. The method of claim 13, wherein:

a Demodulation Reference Signal (DMRS) antenna port associated with a transmission of a PDCCH within at least one of the at least two CORESETs is Quasi-Co-Located with a reference signal for which the reference-signal resource corresponding to the activated index is reserved.

* * * * *